(12) United States Patent
Moll et al.

(10) Patent No.: US 11,001,523 B2
(45) Date of Patent: May 11, 2021

(54) STRENGTHENED GLASS ARTICLES HAVING ETCHED FEATURES AND METHODS OF FORMING THE SAME

(71) Applicant: CORNING INCORPORATED, Corning, NY (US)

(72) Inventors: Johannes Moll, Corning, NY (US); James Joseph Price, Corning, NY (US); Alranzo Boh Ruffin, Painted Post, NY (US); Sergio Tsuda, Horseheads, NY (US); Robert Stephen Wagner, Corning, NY (US); James Joseph Watkins, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 177 days.

(21) Appl. No.: 15/906,225

(22) Filed: Feb. 27, 2018

(65) Prior Publication Data

US 2018/0186693 A1 Jul. 5, 2018

Related U.S. Application Data

(62) Division of application No. 13/800,033, filed on Mar. 13, 2013, now Pat. No. 9,938,186.
(Continued)

(51) Int. Cl.
*C03C 23/00* (2006.01)
*C03C 21/00* (2006.01)
(Continued)

(52) U.S. Cl.
CPC .......... *C03C 23/0025* (2013.01); *B41M 5/24* (2013.01); *B44C 1/227* (2013.01); *B44C 1/228* (2013.01);
(Continued)

(58) Field of Classification Search
CPC .................. C03C 23/0025; C03C 21/00–008
See application file for complete search history.

(56) References Cited

U.S. PATENT DOCUMENTS

| 6,120,131 A | 9/2000 | Murthy et al. |
| 6,143,382 A | 11/2000 | Koyama et al. |

(Continued)

FOREIGN PATENT DOCUMENTS

| CN | 2183994 Y | 11/1994 |
| CN | 201717924 U | 1/2011 |

(Continued)

OTHER PUBLICATIONS

English Translation of KR1020147031685 Office Action dated May 22, 2019, Korea Patent Office, 3 pgs.
(Continued)

*Primary Examiner* — Erin Snelting
(74) *Attorney, Agent, or Firm* — John P. McGroarty

(57) ABSTRACT

Strengthened glass articles having laser etched features, electronic devices, and methods of fabricating etched features in strengthened glass articles are disclosed. In one embodiment, a strengthened glass article includes a first strengthened surface layer and a second strengthened surface layer under a compressive stress and extending from a first surface and a second surface, respectively, of the strengthened glass article to a depth of layer, and a central region between the first strengthened surface layer and the second strengthened surface layer that is under tensile stress. The strengthened glass article further includes at least one etched feature formed by laser ablation within the first surface or the second surface having a depth that is less than the depth of layer and a surface roughness that is greater than a surface roughness of the first surface or second surface outside of the at least one etched feature.

10 Claims, 14 Drawing Sheets

Related U.S. Application Data

(60) Provisional application No. 61/623,722, filed on Apr. 13, 2012.

(51) Int. Cl.
  *B44C 1/22* (2006.01)
  *B41M 5/24* (2006.01)

(52) U.S. Cl.
  CPC ..... *C03C 21/002* (2013.01); *Y10T 428/24479* (2015.01); *Y10T 428/24521* (2015.01)

(56) References Cited

U.S. PATENT DOCUMENTS

| | | | |
|---|---|---|---|
| 6,262,389 B1* | 7/2001 | Koyama | C03C 4/06 204/192.2 |
| 6,268,979 B1* | 7/2001 | Kuroda | C03C 17/36 360/135 |
| 6,470,712 B2* | 10/2002 | Koyama | B23K 26/032 219/121.69 |
| 6,470,742 B1 | 10/2002 | Yamakawa et al. | |
| 6,525,300 B1 | 2/2003 | Mitra et al. | |
| 6,746,964 B2 | 6/2004 | Tsukiji et al. | |
| 6,754,429 B2 | 6/2004 | Borrelli et al. | |
| 7,033,519 B2 | 4/2006 | Taylor | |
| 7,057,135 B2 | 6/2006 | Li | |
| 7,361,405 B2 | 4/2008 | Roemer-Scheuermann et al. | |
| 7,836,727 B2 | 11/2010 | Nishiyama | |
| 8,307,672 B2 | 11/2012 | Hidaka et al. | |
| 8,327,666 B2 | 12/2012 | Harvey et al. | |
| 8,341,976 B2 | 1/2013 | Dejneka et al. | |
| 8,607,590 B2* | 12/2013 | Glaesemann | B23K 26/073 219/121.67 |
| 8,635,887 B2* | 1/2014 | Black | C03B 33/0222 65/105 |
| 8,946,590 B2* | 2/2015 | Li | C03B 33/091 219/121.72 |
| 9,828,277 B2* | 11/2017 | Zhang | B23K 26/40 |
| 2004/0124184 A1 | 7/2004 | An et al. | |
| 2004/0188393 A1 | 9/2004 | Li et al. | |
| 2005/0029238 A1 | 2/2005 | Chen | |
| 2006/0207976 A1 | 9/2006 | Bovatsek et al. | |
| 2007/0024970 A1 | 2/2007 | Lub et al. | |
| 2008/0314883 A1 | 12/2008 | Juodkazis et al. | |
| 2009/0013724 A1 | 1/2009 | Koyo et al. | |
| 2010/0000259 A1 | 1/2010 | Ukrainczyk et al. | |
| 2010/0050692 A1 | 3/2010 | Logunov et al. | |
| 2010/0080961 A1 | 4/2010 | Okamura et al. | |
| 2010/0119486 A1 | 5/2010 | Sawada | |
| 2010/0119846 A1 | 5/2010 | Sawada | |
| 2010/0167059 A1* | 7/2010 | Hashimoto | C03C 21/00 428/410 |
| 2010/0206008 A1 | 8/2010 | Harvey et al. | |
| 2010/0285275 A1* | 11/2010 | Baca | C03C 3/091 428/141 |
| 2010/0289186 A1 | 11/2010 | Longo et al. | |
| 2011/0003619 A1 | 1/2011 | Fujii | |
| 2011/0049765 A1 | 3/2011 | Li et al. | |
| 2011/0187025 A1 | 8/2011 | Costin, Sr. | |
| 2011/0256344 A1 | 10/2011 | Ono et al. | |
| 2011/0300908 A1 | 12/2011 | Grespan et al. | |
| 2012/0013196 A1 | 1/2012 | Kim et al. | |
| 2012/0048604 A1 | 3/2012 | Cornejo et al. | |
| 2012/0135177 A1 | 5/2012 | Cornejo et al. | |
| 2012/0135195 A1* | 5/2012 | Glaesemann | C03B 33/02 428/156 |
| 2012/0196071 A1 | 8/2012 | Cornejo et al. | |
| 2012/0261697 A1 | 10/2012 | Margalit et al. | |
| 2013/0071601 A1* | 3/2013 | Bibl | C03C 23/0025 428/67 |
| 2013/0192305 A1* | 8/2013 | Black | B23K 26/0648 65/30.14 |
| 2013/0209731 A1 | 8/2013 | Nattermann et al. | |
| 2013/0247615 A1 | 9/2013 | Boek et al. | |

FOREIGN PATENT DOCUMENTS

| | | |
|---|---|---|
| CN | 102036927 B | 7/2014 |
| DE | 102010003817 B4 | 4/2013 |
| EP | 1164113 A1 | 12/2001 |
| EP | 2020273 A1 | 2/2009 |
| EP | 2253414 A1 | 11/2010 |
| JP | 5428590 A | 3/1979 |
| JP | 03252384 A | 11/1991 |
| JP | H0412839 A | 1/1992 |
| JP | H08133786 A | 5/1996 |
| JP | 9138942 A | 5/1997 |
| JP | H1152140 A | 2/1999 |
| JP | 11120546 A | 4/1999 |
| JP | 2000-301372 A | 10/2000 |
| JP | 2002028799 A | 1/2002 |
| JP | 2002348146 A | 12/2002 |
| JP | 2003001372 A | 1/2003 |
| JP | 200566687 A | 3/2005 |
| JP | 2005324997 A | 11/2005 |
| JP | 2006027023 A | 2/2006 |
| JP | 2006259325 A | 9/2006 |
| JP | 4349132 B2 | 10/2009 |
| JP | 2011143434 A | 7/2011 |
| JP | 2011150455 A | 8/2011 |
| KR | 20110046953 A | 5/2011 |
| RU | 2326830 C1 | 6/2006 |
| WO | 2001033621 A2 | 5/2001 |

OTHER PUBLICATIONS

Japanese Patent Application No. 2015505798; Machine Translation of the Notice of Allowance dated Sep. 4, 2019; 2 Pgs.; Japan Patent Office.

"Laser Pulse Damage on the Surface of Ion Exchange Treated Glass"; L.L. Mukhina, V.V. Proyanenkav, A.M. Kondyrev, A.E. Chmel; Dec. 25, 1991; pp. 269-272.

D.M. Karnakis et al., "Comparison of glass processing using high repetition femtosecond (800nm) and UV (255nm) nanosecond pulsed lasers", Photonics West 2005, MOEMS-MEMS 2005 Micro & Nanofabrication, Microfluidics II BioMEMs and Medical Microsystems III Jan. 22, 2005.

DeWitt, Tom, Range Findings with Diffraction Gratings, Jul. 1988, Advanced Imaging, obtained from http://www.3dewitt.com/2/P D F/ Advanced Imaging_ 1 988. pdf.

Loewen, E., et al., Diffraction Grating Handbook, 2005, Newport Corporation, Sxth edition, pp. 1-271.

Madehow.com, Liquid Crystal Display (LCD), Jan. 29, 2006, https ://web. arch ive.org/web/20060129092154/http://www. made how .com/Volume-1 /Liquid-Crystal-Display-LCD. html.

Mukhina et al; "Laser Pulse Damage on the Surface of Ion Exchange Treated Glass"; Glass Physics and Chemistry, 19 (1993) June, No. 3, New York 269-272.

English Translation of JP2015505798 Office Action dated Apr. 24, 2018; 5 Pages; Japanese Patent Office.

* cited by examiner

STRENGTHENED GLASS ARTICLES HAVING ETCHED FEATURES AND METHODS OF FORMING THE SAME

CROSS-REFERENCE TO RELATED APPLICATIONS

This application is a divisional of U.S. patent application Ser. No. 13/800,033 filed on Mar. 13, 2013, which claims the benefit of U.S. Provisional Patent Application Ser. No. 61/623,722 entitled "STRENGTHENED GLASS ARTICLES HAVING ETCHED FEATURES AND METHODS OF FORMING THE SAME," filed on Apr. 13, 2012, the entire disclosure of each of which is hereby incorporated by reference herein.

BACKGROUND

Field

The present specification generally relates to strengthened glass articles and, more particularly, strengthened glass articles having etched features, as well as electronic devices incorporating such strengthened glass articles and methods of forming etched features in strengthened glass articles.

Technical Background

Thin, strengthened glass panels have a variety of applications in consumer electronic devices. For example, such strengthened glass panels may be used as cover sheets and/or touch screens for LCD and LED displays incorporated in mobile telephones, GPS devices, display devices such as televisions and computer monitors, and various other electronic devices. As the use of strengthened glass panels continues to expand, the geometric complexity of the glass panels also increases. For example, certain applications may require etched features within the surface of the strengthened glass panels for tactile differentiation and/or decorative purposes. Currently, such visual or functional features are provided in strengthened glass applications by laying films, paint or other materials that is then machined (e.g., by computer numeric control machining) to provide for visual references, such as a depressed or embossed surface of ON/OFF buttons on touch devices where the visual references have some specific texture making them easy to identify by touch or vision. In other cases, the features are provided on the enclosure wrapping the touch display. However, it may be desirable to provide for etched features directly on the surface of the strengthened cover articles.

SUMMARY

A first aspect of the present disclosure is a method of fabricating a strengthened glass article having an etched feature that includes providing a non-strengthened glass article having a first surface and a second surface and focusing a laser beam onto the first surface of the non-strengthened glass article to ablate material from the first surface. The laser beam has a wavelength that is substantially transparent to the non-strengthened glass article. The method further includes translating the laser beam within a boundary defined by a desired etched feature such that translation of the laser beam ablates the material from the first surface at a depth to form the etched feature, and chemically strengthening the non-strengthened glass article by a chemical strengthening process after forming the etched feature. The strengthened glass article has a first strengthened surface layer and a second strengthened surface layer under a compressive stress and extending from the first surface and the second surface of the strengthened glass article, respectively, to a depth of layer, and a central region between the first strengthened surface layer and the second strengthened surface layer that is under tensile stress. The depth of the etched feature is less than the depth of layer such that the etched feature is within the compressive stress layer.

A second aspect of the disclosure is the method of the aforementioned aspect wherein, prior to chemically strengthening the non-strengthened glass article, the etched feature is chemically etched to reduce a surface roughness of a surface of the etched feature.

A third aspect of the disclosure is the method of any aforementioned aspect, wherein the laser beam is operated such that a surface of the etched feature has a roughness that is greater than a region of the first surface outside of the etched feature.

A fourth aspect of the disclosure is the method of any aforementioned aspect, wherein the laser beam includes a focused beam spot on the first surface of the non-strengthened glass article that is about 20 µm.

A fifth aspect of the disclosure is the method of any aforementioned aspect, wherein the laser beam is a continuous wave laser beam.

A sixth aspect of the disclosure is the method of any aforementioned aspect, wherein the laser beam is a pulsed laser beam.

A seventh aspect of the disclosure is the method of the sixth aspect, wherein the pulsed laser beam has a pulse width greater than 10 femtoseconds.

An eight aspect of the disclosure is the method of the sixth aspect, wherein the pulsed laser beam has a pulse width between 1 picosecond and 500000 picoseconds.

A ninth aspect of the disclosure is the method of any of the sixth through eight aspects, wherein the pulsed laser beam is pulsed at a frequency of less than about 100 MHz.

A tenth aspect of the disclosure is the method of any of the sixth through ninth aspects, wherein the pulsed laser beam has an average power that is greater than an ablation threshold of the non-strengthened glass article.

An eleventh aspect of the disclosure is the method of the sixth aspect, wherein the laser beam is a pulsed laser beam having a pulse width of about 10 picoseconds, a frequency of about 100 kHz, and an average power of about 1.8 W.

A twelfth aspect of the disclosure is the method of any aforementioned aspect, wherein the pulsed laser beam is translated on the first surface of the non-strengthened glass article at a scan speed within a range of about 10 cm/s to about 120 cm/s.

A thirteenth aspect of the disclosure is the method of any aforementioned aspect, wherein the non-strengthened glass article includes a non-strengthened alkali aluminosilicate glass, a non-strengthened aluminosilicate glass, or a non-strengthened soda lime glass.

A fourteenth aspect of the disclosure is the method of any aforementioned aspect, wherein the non-strengthened glass article has a thickness of less than 1 mm.

A fifteenth aspect of the disclosure is the method of any aforementioned aspect, wherein the defect size is within a range of about 10 µm to about 40 µm.

A sixteenth aspect of the disclosure is the method of any aforementioned aspect, wherein the depth of layer of the strengthened glass article is greater than about 5 μm and has a surface compression of greater than about 100 MPa.

A seventeenth aspect of the disclosure is the method of any aforementioned aspect, wherein translating the laser beam includes translating the laser beam within the boundary of the desired etched feature to form a plurality of first defect lines along a first direction, and translating the laser beam within the boundary of the desired etched feature to form a plurality of second defect lines along a second direction, wherein the plurality of first defect lines intersect the plurality of second defect lines.

An eighteenth aspect of the disclosure is the method of the seventeenth aspect, wherein translating the laser beam further includes translating the laser beam along the plurality of first defect lines and the plurality of subsequent defect lines in one or more additional laser beam passes.

A nineteenth aspect of the disclosure is the method of any aforementioned aspect, wherein the translating laser beam forms a cross-hatch defect pattern within the boundary of the desired etched feature.

A twentieth aspect of the disclosure is the method of any aforementioned aspect, wherein translating the laser beam includes translating the laser beam in a swirl pattern within the boundary of the desired etched feature.

A twenty-first aspect of the disclosure is the method of any aforementioned aspect, wherein a compressive strength of the etched feature is substantially similar to a compressive strength of a surface of the strengthened glass article outside of the etched feature.

A twenty-second aspect of the disclosure is the method of any aforementioned aspect, further including applying one or more thin layers of material on the surface of the strengthened glass article such that the one or more thin layers of material are disposed on the etched feature.

A twenty-third aspect of the disclosure is the method of the twenty-second aspect, wherein the one or more thin layers include a holographic layer, an iridescent layer, a matte layer, or combinations thereof.

A twenty-fourth aspect of the disclosure is the method of any aforementioned aspect, wherein translating the laser beam creates a plurality of defect lines separated by a separation distance such that the plurality of defect lines create a diffractive grating within the boundary of the etched feature.

A twenty-fifth aspect of the disclosure is a strengthened glass article that includes a first strengthened surface layer and a second strengthened surface layer under a compressive stress and extending from a first surface and a second surface, respectively, of the strengthened glass article to a depth of layer, and a central region between the first strengthened surface layer and the second strengthened surface layer that is under tensile stress. The strengthened glass article further includes at least one etched feature within the first surface or the second surface having a depth that is less than the depth of layer and a surface roughness that is greater than a surface roughness of the first surface or second surface outside of the at least one etched feature, wherein the at least one etched feature is formed by laser ablation.

A twenty-sixth aspect of the disclosure is the strengthened article of the twenty-fifth aspect, wherein the strengthened glass article includes a strengthened alkali aluminosilicate glass, a strengthened aluminosilicate glass, or a strengthened soda lime glass.

A twenty-seventh aspect of the disclosure is the strengthened article of the twenty-fifth aspect or the twenty-sixth aspect, wherein the strengthened glass article is chemically strengthened by an ion exchange process.

A twenty-eighth aspect of the disclosure is the strengthened article of any of the twenty-fifth through twenty-seventh aspects, wherein the strengthened glass article has a thickness of less than 1 mm.

A twenty-ninth aspect of the disclosure is the strengthened article of any of the twenty-fifth through twenty-eighth aspects, wherein the defect depth is within a range of about 10 μm to about 40 μm.

A thirtieth aspect of the disclosure is the strengthened article of any of the twenty-fifth through twenty-ninth aspects, wherein the depth of layer of the strengthened glass article is greater than 5 μm and has a surface compression of greater than about 100 MPa.

A thirty-first aspect of the disclosure is the strengthened article of any of the twenty-fifth through thirtieth aspects, wherein the strengthened glass article is an alkali aluminosilicate glass having a thickness of about 0.7 mm, a depth of layer of at least 10 μm, and a surface compression greater than about 750 MPa, and the defect depth is less than about 40 μm.

A thirty-second aspect of the disclosure is the strengthened article of any of the twenty-fifth through thirty-first aspects, wherein the at least one etched feature is defined by a plurality of intersecting defect lines that form a cross-hatch defect pattern.

A thirty-third aspect of the disclosure is the strengthened article of any of the twenty-fifth through thirty-second aspects, wherein the at least one etched feature is defined by one or more swirl defect lines within a boundary of the at least one etched feature.

A thirty-fourth aspect of the disclosure is the strengthened article of any of the twenty-fifth through thirty-third aspects, wherein a compressive strength of the at least one etched feature is substantially similar to a compressive strength of a surface of the strengthened glass article outside of the at least one etched feature.

A thirty-fifth aspect of the disclosure is the strengthened article of any of the twenty-fifth through thirty-fourth aspects, wherein the at least one etched feature includes a wall that separates the at least one etched feature from a surrounding surface of the strengthened glass article.

A thirty-sixth aspect of the disclosure is the strengthened article of the thirty-fifth aspect, wherein the wall is substantially vertical.

A thirty-seventh aspect of the disclosure is the strengthened article of any of the twenty-fifth through thirty-sixth aspects, wherein an opacity of the at least one etched feature is greater than an opacity of the strengthened glass article outside of the at least one etched feature.

A thirty-eighth aspect of the disclosure is the strengthened article of any of the twenty-fifth through thirty-seventh aspects, wherein the etched feature includes a plurality of defect lines separated by a separation distance, and the separation distance is such that the plurality of defect lines create a diffractive grating within the boundary of the etched feature.

A thirty-ninth aspect of the disclosure is the strengthened article of any of the twenty-fifth through thirty-eighth aspects, further including one or more thin layers of material disposed on the surface of the strengthened glass article and the etched feature.

A fortieth aspect of the disclosure is an electronic device that includes a strengthened cover glass having a first strengthened surface layer and a second strengthened surface layer under a compressive stress and extending from a first surface and a second surface, respectively, of the strengthened cover glass to a depth of layer, and a central region between the first strengthened surface layer and the second strengthened surface layer that is under tensile stress. The strengthened cover glass further includes at least one etched feature formed by laser ablation within the first surface or the second surface having a defect depth that is less than the depth of layer and a surface roughness that is greater than a surface roughness of the first or second surface outside of the at least one etched feature.

A forty-first aspect of the disclosure is the electronic device of the fortieth aspect, wherein the strengthened cover glass is configured as a touch screen, and the at least one etched feature delineates at least one soft key of the electronic device.

A forty-second aspect of the disclosure is the electronic device of the forty-first aspect, wherein the at least one soft key is an on/off button.

A forty-third aspect of the disclosure is the electronic device of any of the fortieth through forty-second aspects, wherein the strengthened cover glass includes a strengthened alkali aluminosilicate glass, a strengthened aluminosilicate glass, or a strengthened soda lime glass.

A forty-forth aspect of the disclosure is the electronic device of any of the fortieth through forty-third aspects, wherein the strengthened cover glass is chemically strengthened by an ion exchange process.

A forty-fifth aspect of the disclosure is the electronic device of any of the fortieth through forty-forth aspects, wherein the strengthened cover glass has a thickness of less than 1 mm.

A forty-sixth aspect of the disclosure is the electronic device of any of the fortieth through forty-fifth aspects, wherein the defect depth is within a range of about 10 µm to about 40 µm.

A forty-seventh aspect of the disclosure is the electronic device of any of the fortieth through forty-sixth aspects, wherein the depth of layer of the strengthened cover glass is greater than 5 µm and has a surface compression of greater than about 100 MPa.

A forty-eighth aspect of the disclosure is the electronic device of any of the fortieth through forty-seventh aspects, wherein the strengthened cover glass includes an alkali aluminosilicate glass having a thickness of about 0.7 mm, a depth of layer of about 40 µm, and a surface compression greater than about 750 MPa, and the defect depth is less than about 40 µm.

A forty-ninth aspect of the disclosure is the electronic device of any of the fortieth through forty-eighth aspects, wherein the at least one etched feature is defined by a plurality of intersecting defect lines that form a cross-hatch defect pattern.

A fiftieth aspect of the disclosure is the electronic device of any of the fortieth through forty-ninth aspects, wherein the at least one etched feature is defined by one or more swirl defect lines within a boundary of the at least one etched feature.

A fifty-first aspect of the disclosure is the electronic device of any of the fortieth through fiftieth aspects, wherein a compressive strength of the at least one etched feature is substantially similar to a compressive strength of a surface of the strengthened cover glass outside of the at least one etched feature.

A fifty-second aspect of the disclosure is the electronic device of any of the fortieth through fifty-first aspects, wherein the at least one etched feature includes a wall that separates the at least one etched feature from a surrounding surface of the strengthened cover glass.

A fifty-third aspect of the disclosure is the electronic device of the fifty-second aspect, wherein the wall is substantially vertical.

A fifty-forth aspect of the disclosure is the electronic device of any of the fortieth through fifty-third aspects, wherein an opacity of the at least one etched feature is greater than an opacity of the strengthened cover glass outside of the at least one etched feature.

A fifty-fifth aspect of the disclosure is a method of fabricating a strengthened glass article having an etched feature that includes providing a strengthened glass substrate comprising a first surface and a second surface, wherein the strengthened glass article comprises a first strengthened surface layer and a second strengthened surface layer under a compressive stress and extending from the first surface and the second surface of the strengthened glass article, respectively, to a depth of layer, and a central region between the first strengthened surface layer and the second strengthened surface layer that is under tensile stress. The method further includes depositing one or more layers of material on the first surface and/or the second surface of the strengthened glass substrate, focusing a laser beam onto the one or more layers of material, and translating the laser beam relative to the strengthened glass substrate within a boundary defined by a desired etched feature, wherein translation of the laser beam ablates material from a first surface of the one or more layers of material at a depth to form the etched feature within the one or more layers of material, and the strengthened glass substrate remains undamaged from the laser beam.

A fifty-sixth aspect of the disclosure is the method of the fifty-fifth aspect, wherein the etched feature includes a plurality of defect lines separated by a separation distance, and the separation distance is such that the plurality of defect lines create a diffractive grating within the boundary of the etched feature.

A fifty-seventh aspect of the disclosure is the method of the fifty-sixth aspect, wherein etched features are formed in multiple strengthened glass articles defined by a mother glass sheet prior to separation.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of strengthened glass articles having laser micromachined etched features, as well as methods of fabricating such etched features, and electronic devices incorporating strengthened glass articles with laser micromachined etched features. Embodiments of the present disclosure provide for strengthened glass articles having surfaces that are modified to include laser micromachined shapes, logos, and other contours for decorative, tactile and other functional purposes, as well as methods for producing the same. The etched features may provide for tactile differentiation, which may indicate the location of a virtual button (i.e., a soft key), such as an ON/OFF button or a "Home" button, as non-limiting examples. The etched features within the surface of the strengthened glass article may have a similar compressive stress resistance as untouched surfaces of the strengthened glass article.

Figure 1:
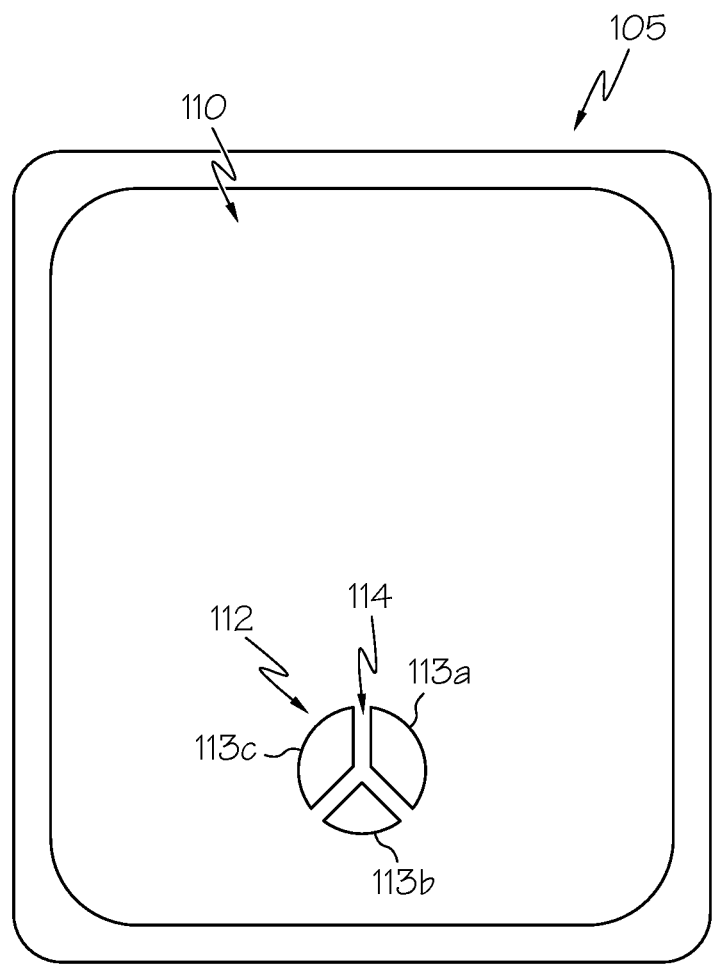
FIG. 1 schematically depicts an exemplary electronic device having a strengthened cover glass with an etched feature according to one or more embodiments described and illustrated herein.

Referring now to FIG. 1, an exemplary electronic device 105 comprising a strengthened glass article 110 having an etched feature 112 formed by laser ablation micromachining is schematically depicted according to one or more embodiments shown and described herein. The strengthened glass article 110, which may be formed from a mother glass sheet, may be configured as a strengthened cover glass in the electronic device. Strengthened glass articles 110 as described herein may also be configured as any glass component where etched features are desired (e.g., glass surfaces on appliances such as refrigerators, televisions, and the like). As such, the strengthened glass articles 110 having etched features 112 are not limited to use as a strengthened cover glass in electronic devices. The strengthened glass article 110 may be a substantially flat glass article, or configured as a curved or shaped glass article, for example.

The etched feature 112 may be of any arbitrarily designed shape, logo, contour, and the like, to provide for decorative, tactile and other functionalities. For example, the etched feature 112 may extend partially into a surface of the strengthened glass article 110 and have a surface roughness that provides a tactile difference between the etched feature 112 and the remaining surface of the strengthened glass article 110. The surface roughness may be measured in root mean squared, for example ($R_{RMS}$) The etched feature(s) 112 may provide tactile feedback to the user regarding various buttons of the electronic device 105 or other assembly. As a non-limiting example, the strengthened glass article 110 illustrated in FIG. 1 may have one or more touch layers that provide touch screen capabilities to the electronic device 105, and the etched feature 112 may be associated with a region of the touch screen that provides for a "Home" button, an "ON/OFF" button, and the like. For example, the combination of the visual and tactile signatures of the etched feature 112 on the glass surface and the function of turning an electronic device 105 on and off can be achieved by positioning the laser etched feature 112 on a capacitive sensor that can switch the electronic device on or off. The high scratch and damage resistance of the glass in general and at that particular location may be important for this type of function and with the additional benefit that the "virtual" button is less susceptible to failure due to repetitive mechanical activation. The surface roughness of the etched feature(s) 112 may be different (e.g., greater) from the remaining surface of the strengthened glass article 110 so that the user may locate the particular button or buttons using his or her sense of touch only. As stated above, the etched feature 112 may also change the opacity of the strengthened glass article 110 such that it is visible to the human eye. Accordingly, arbitrarily shaped etched features may be used for decorative purposes in addition to functional purposes.

The exemplary etched feature 112 depicts an inverted "Y" shape 114 within a circle that is defined by three laser etched regions 113a-113c. The surface of the strengthened glass article outside of the three etched laser etched regions 113a-113c is not etched by the application of a laser beam. The exemplary etched feature 112 may be used as a touch button, as described above. The inverted "Y" shape and the three laser etched regions 113a-113c may provide a distinct feel to the user of the strengthened glass article 110. It should be understood that embodiments of the strengthened glass articles and electronic devices described herein are not limited to the exemplary etched feature 112 depicted in FIG. 1.

As described in more detail below, the etched feature(s) 112 may be first fabricated in a non-strengthened glass substrate (e.g., a glass substrate sheet or a smaller pre-separated glass substrate article) that is then strengthened by a strengthening process, such as chemical strengthening or thermal tempering. Chemically strengthened glasses, such as those strengthened by an ion-exchange process, have found wide-spread application in touch panels, portable displays, and other applications because of their excellent strength and damage resistance. These strength properties may be important when the strengthened glass article acts as a cover glass for a device that is exposed to high levels of contact with surfaces. The damage resistance of chemically strengthened glass articles is a result of surface compression layers 151a, 151b formed on the glass substrate by ion-exchange (see FIG. 12, discussed in detail below). The surface compression is balanced by a tensile region 152 under tension in the interior of the glass substrate. Surface compressions greater than 750 MPa and compressive depth of layer (DOL) greater than 40 μm are readily achieved in chemically strengthened glass articles (e.g., Gorilla® Glass manufactured by Corning Incorporated). Other glasses, such as soda-lime glass, may also be chemically strengthened with surface compressions typically less than 500 MPa and DOL less than 15 μm.

In one embodiment, the strengthened glass article is fabricated from an alkali aluminosilicate glass comprising: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrP>10 mol %; 5 mol %≤MgO+CaO+SrO≤8 mol %; ($Na_2O$+$B_2O_3$)—$Al_2O_3$≥2 mol %; 2 mol %≤$Na_2O$—$Al_2O_3$≤6 mol %; and 4 mol %≤($Na_2O$+$K_2O$)—$Al_2O_3$≤10 mol %.

In another embodiment, the strengthened glass article is fabricated from an alkali aluminosilicate glass comprising: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %.

In another embodiment, the alkali aluminosilicate glass comprises $SiO_2$ and $Na_2O$, wherein the glass has a temperature $T_{35\,kp}$ at which the glass has a viscosity of 35 kilo poise (kpoise), wherein the temperature $T_{breakdown}$ at which zircon breaks down to form $ZrO_2$ and $SiO_2$ is greater than $T_{35\,kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO.

In another embodiment, the alkali aluminosilicate glass comprises at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σ alkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$.

In another embodiment, the alkali aluminosilicate glass comprises $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$.

In still other embodiments, the alkali aluminosilicate glass comprises at least about 4 mol % $P_2O_5$, wherein ($M_2O_3$ (mol %)/$R_xO$ (mol %))<1, wherein $M_2O_3$=$Al_2O_3$+$B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein −340+27.1.$Al_2O_3$−28.7.$B_2O_3$+15.6.$Na_2O$−61.4.$K_2O$+8.1.(MgO+ZnO)≥0 mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO.

In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

Other materials may also be used laser machined by the embodiments described herein, such as aluminosilicate glass, soda lime glass, and glass ceramics.

A thickness of the glass substrate from which the strengthened glass article 110 is fabricated depends on the particular application in which the strengthened glass article 110 is to be implemented. As an example and not a limitation, the thickness of the glass substrate may be within a range of about 0.3 mm and about 1.5 mm. Other thicknesses are also possible. Further, the glass articles may come in a variety of sizes depending on the application.

Generally, the etched feature 112 may be fabricated by laser ablation of a non-strengthened glass article or glass substrate sheet using a laser beam such that the etched feature 112 has a desired texture, visual feature, and depth. The laser beam may be an ultra-short pulsed laser beam or a continuous wave (CW) laser beam that creates defects within a boundary of the desired etched feature. In the case of an ultra-short pulsed laser beam, the non-thermal ablative properties of the interaction between short laser pulses and the glass material results in processed surfaces with fewer defects and less residual stress. The etched glass article may then be strengthened by a strengthening process, as described below.

Figure 2:
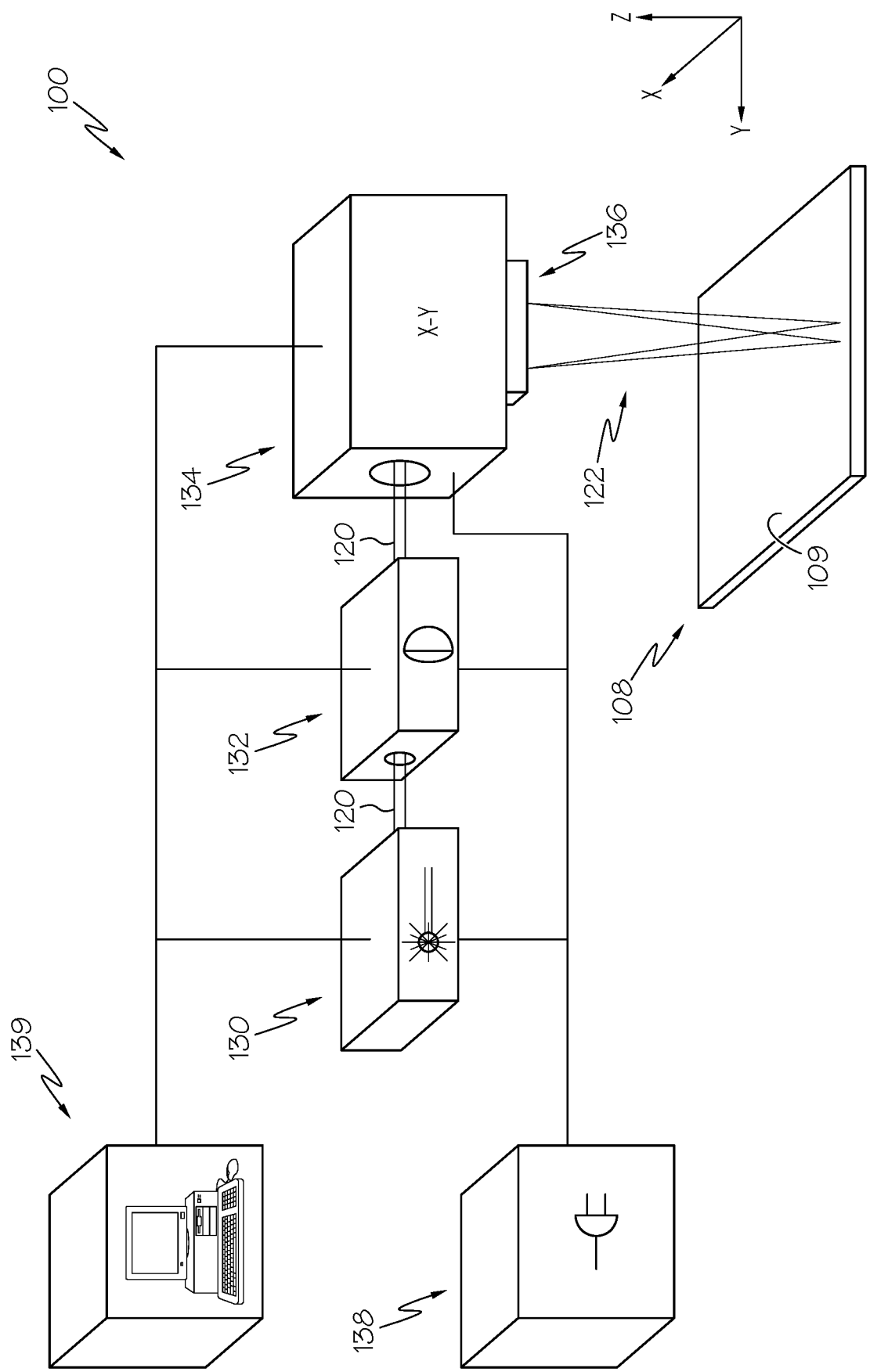
FIG. 2 schematically depicts an exemplary laser etching system used to form etched features within a glass substrate according to one or more embodiments described and illustrated herein.

Referring now to FIG. 2, an exemplary laser etching system 100 is schematically illustrated. It should be understood that embodiments of the present disclosure are not limited to the exemplary laser etching system 100 depicted in FIG. 2, and that embodiments may include more, fewer and/or different components than those that are illustrated. Generally, the illustrated laser etching system 100 comprises a laser 130, laser beam conditioning optics 132, and a scanning device 134. The laser 130 may be configured to emit a laser beam 120 that has a wavelength and an intensity such that, after being focused or otherwise conditioned by the laser beam conditioning optics 132 and the scanning device 134, operates in a nonlinear regime where the scanned laser beam 122 induces nonlinear optical absorption such that the laser light is absorbed and there is energy transfer between the scanned laser beam 122 and the glass material of a non-strengthened glass article 108 that is being processed. The non-strengthened glass article 108 may be flat, or curved or otherwise shaped in some embodiments. Embodiments are not limited to any particular shape of non-strengthened glass article. The laser beam 120 may have any wavelength that is capable of producing nonlinear optical absorption relative to the glass material. In one embodiment, the wavelength of the laser beam 120 is within a range of about 350 nm to about 1070 nm. As a non-limiting example, the laser 130 may be operated to emit a laser beam 120 having a wavelength of about 355 nm, about 532 nm, and/or about 1064. The laser 130 may also be operated at an average power that is greater than an ablation threshold of the non-strengthened glass article 108. In one embodiment, the average power of the scanned laser beam 122 delivered to the non-strengthened glass article 108 is greater than about 1.5 W. In another embodiment, the average power of the scanned laser beam 122 delivered to the non-strengthened glass article 108 is greater than about 8 W. The laser beam 120 may be a pulsed laser beam or a CW laser beam, depending on the particular application.

The laser beam conditioning optics 132 may be configured as one or more optical components that focus and/or collimate the laser beam 120 in preparation for scanning by the scanning device 134. In one embodiment, the laser beam conditioning optics 132 comprises one or more collimating lenses to collimate the laser beam 120, one or more dynamic focusing lenses to dynamically adjust a focus of the laser beam 120, or combinations thereof. Other optical components may also be included in the laser beam conditioning optics 132 (e.g., a beam expander).

The scanning device 134 is configured as a laser scanner that may scan the laser beam 120 along the x- and y-axes such that the scanned laser beam 122 ablates a surface 109 of the non-strengthened glass article 108 according to the desired shape of the etched feature(s). In this manner, the scanned laser beam 122 is translated across the surface 109 of the non-strengthened glass article 108. The scanning device 134 may be configured as a pair of individually driven galvo scanning mirrors. As an example and not a limitation, the scanning device 134 may be an intelliSCAN® model laser scan head sold by SCANLAB AB. The scanning device 134 may further comprise a focusing lens 136, such as an f-theta lens, to control the position of the beam waist of the scanned laser beam 122 along the z-axis. It should be understood that translating the laser beam 122 relative to the non-strengthened glass article 108 may also include translating the non-strengthened glass article 108 while keeping the laser beam 122 stationary. Alternatively, the laser beam 122 and the non-strengthened glass article 108 may be simultaneously moved to translate the laser beam 122 relative to the non-strengthened glass article 108.

Although only a single laser beam 122 is shown in FIG. 2, it should be understood that multiple laser beams 122 may be incident one or more non-strengthened glass articles 108 to ablate one or more etched features 112 simultaneously. For example, multiple lasers 130 may be provided and/or beam splitters may be used to split laser beam 120 into multiple laser beams 122 directed to one or more non-strengthened glass articles 108. As an example and not a limitation, multiple synchronized laser beams 122 may be utilized to increase throughput.

The scan speed S of the scanned laser beam 122 may be selected based on a variety of factors including, but not limited to, desired surface roughness of the etched feature 112, the desired part fabrication throughput, the frequency of the laser beam, whether the scanned laser beam 122 is a pulsed laser beam or a CW laser beam, the frequency of the laser pulses, and the intensity of the laser pulses. Various scan speeds, as well as scan speed considerations, are discussed in detail below.

One or more of the laser 130, the laser beam conditioning optics 132, and the scanning device 134 may be controlled by a computing device 139, which may be configured as a general purpose computer running control software, application-specific hardware configured to control the components of the laser etching system 100, or combinations thereof. Further, one or more of the laser 130, the laser beam conditioning optics 132, and the scanning device 134 may receive electrical power from a power source 138, such as the electric grid, generator, or battery power source. The laser etching process may be configured to laser etch multiple glass articles of a mother glass sheet (i.e., prior to separation of the glass articles from the mother glass sheet), or glass articles individually (i.e., glass articles that were previously separated from a mother glass sheet).

Figure 3:
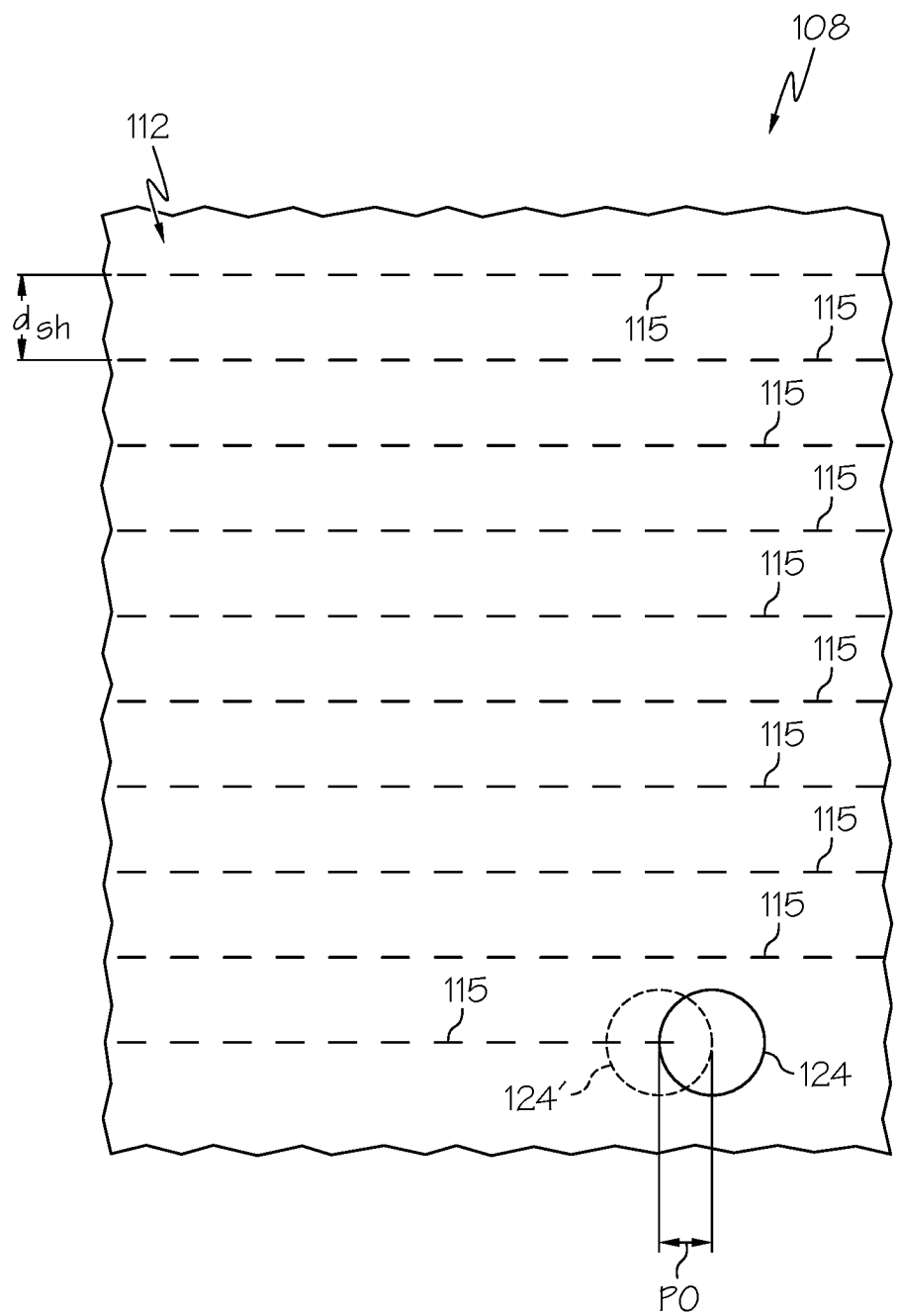
FIG. 3 schematically depicts a non-strengthened glass article subjected to a laser micromachining process impressing defect lines in a particular pattern according to one or more embodiments described and illustrated herein.

Referring now to FIG. 3, the laser 130 may be configured as an ultra short pulse laser capable of emitting a laser beam 120 comprising a series of laser light pulses. The duration of the laser light pulses may be within a range of 10 femtoseconds up to CW. The pulsed laser beam 122 (i.e., the scanned laser beam 122 comprising a series of laser pulses) creates a series of beam spots 124 that create laser modified areas or defects within the surface of the non-strengthened glass article 108 by non nonlinear optical absorption. The beam spots 124 may have a diameter of about 20 µm, for example. However, diameters greater or less than 20 µm may be utilized in embodiments. FIG. 3 depicts a plurality of horizontal defect lines 115 comprising a plurality of laser modified areas formed by nonlinear optical absorption laser ablation, as well as a previous beam spot 124' and a current beam spot 124. No directional limitations are intended by the use of terms such as "horizontal" and "vertical," as these terms are used merely as examples. The current beam spot 124 overlaps the previous beam spot 124' by a pulse overlap PO distance. The size of the pulse overlap PO may depend on the diameter o the beam spot, the scan speed S, as well as the pulse frequency f of the scanned laser beam 122. In embodiments, the pulse frequency f is within a range of 10 kHz to 500 kHz. In some embodiment, the pulse frequency f is less than about 100 MHz. However, greater or lesser frequencies may be utilized depending on the application.

The quality of the laser modified area formed by the beam spots 124 may be determined by how the energy transfer between the scanned laser beam 122 and the glass material, and how the material responds to that energy provided by the scanned laser beam 122. The wavelength of the scanned laser beam 122 and the material absorption spectrum may determine how much linear absorption will occur, and the laser intensity and glass material optical properties may dictate whether there are any nonlinear optical phenomena present in the interaction between the laser and the glass material. Depending on how long the laser-glass interaction lasts, and how fast the material releases the energy transferred from the scanned laser beam 122, there will be more or less heat loading or dissipation. For example, if a scanned laser beam 122 having a wavelength that is highly absorptive and is operated in a CW mode to ablate the surface of the non-strengthened glass article 108, a significant amount of heat will be generated and a heated affected zone will be created where stress will begin to accumulate and defects and cracks may be formed. However, if a pulsed scanned laser beam 122 is used to perform the same operation (e.g., as depicted in FIG. 3), the energy transfer from the pulsed scanned laser beam 122 to the glass material may be better controlled by adjusting the "dosage" of energy via laser light pulse width, repetition rate (i.e., frequency f), and average power, for example. Although there are applications where operating the laser 130 in CW mode may produce desirable etched features, generally the longer the pulse width of the scanned laser beam 122, the lesser the quality of the etched feature(s) 112.

The scanning device 134 may be programmed to scan the scanned laser beam 122 across the non-strengthened glass article 108 over scan lines to form the plurality of horizontal defect lines 115. In the embodiment illustrated in FIG. 3, the horizontal defect lines 115 are separated by a horizontal separation distance $d_{sh}$. The horizontal separation distance $d_{sh}$, will impact the amount of pulse overlap PO between successive pulses of laser light. In some embodiments, the scanning device 134 may be controlled to perform multiple scans of the scanned laser beam 122 across the plurality of horizontal defect lines 115. It is noted that the defect lines depicted in FIG. 3 (and vertical defect lines 116 of FIG. 4) only schematically represent the defects impressed on the surface of the non-strengthened glass article 108 as dashed lines, and do not represent actual modified regions or defects.

Figure 4:
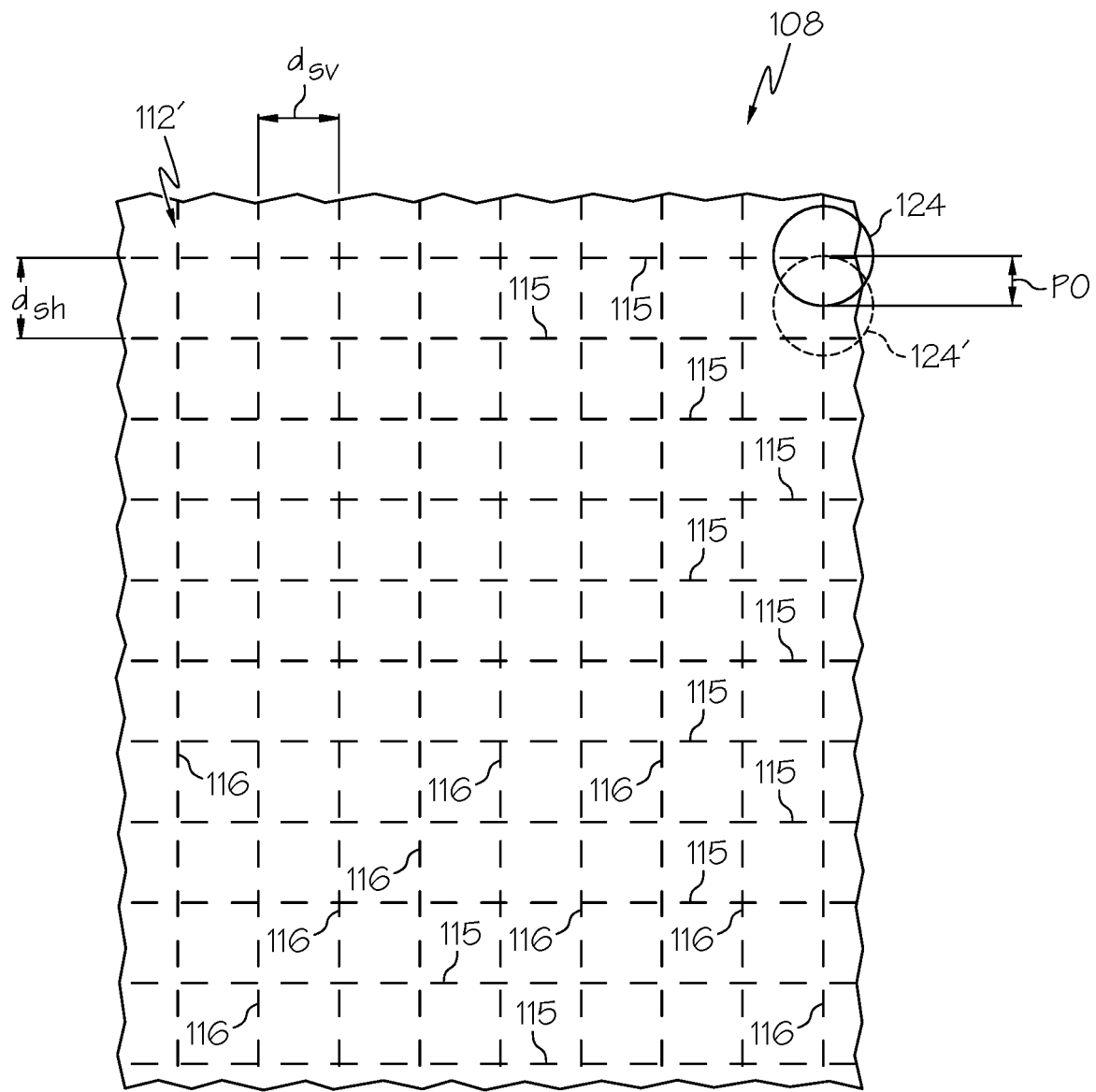
FIG. 4 schematically depicts a non-strengthened glass article subjected to a laser micromachining process impressing defect lines in another pattern according to one or more embodiments described and illustrated herein.

Referring now to FIG. 4, an embodiment wherein a plurality of horizontal defect lines 115 and a plurality of vertical defect lines 116 are created to form a cross-hatch defect pattern within the etched feature 112' is schematically illustrated. For example, the plurality of horizontal defect lines 115 may be generated by successive horizontal scans of the scanned laser beam 122, and the plurality of vertical defect lines 116 may be formed by successive vertical scans of the scanned laser beam 122. The plurality of horizontal defect lines 115 are separated by a horizontal separation distance $d_{sh}$, and the plurality of vertical defect lines are separated by a vertical separation distance $d_{sv}$. The values of the horizontal separation distance $d_{sh}$, and the vertical separation distance $d_{sv}$ will impact the pulse overlap PO during horizontal and vertical scans, respectively.

Figure 5:
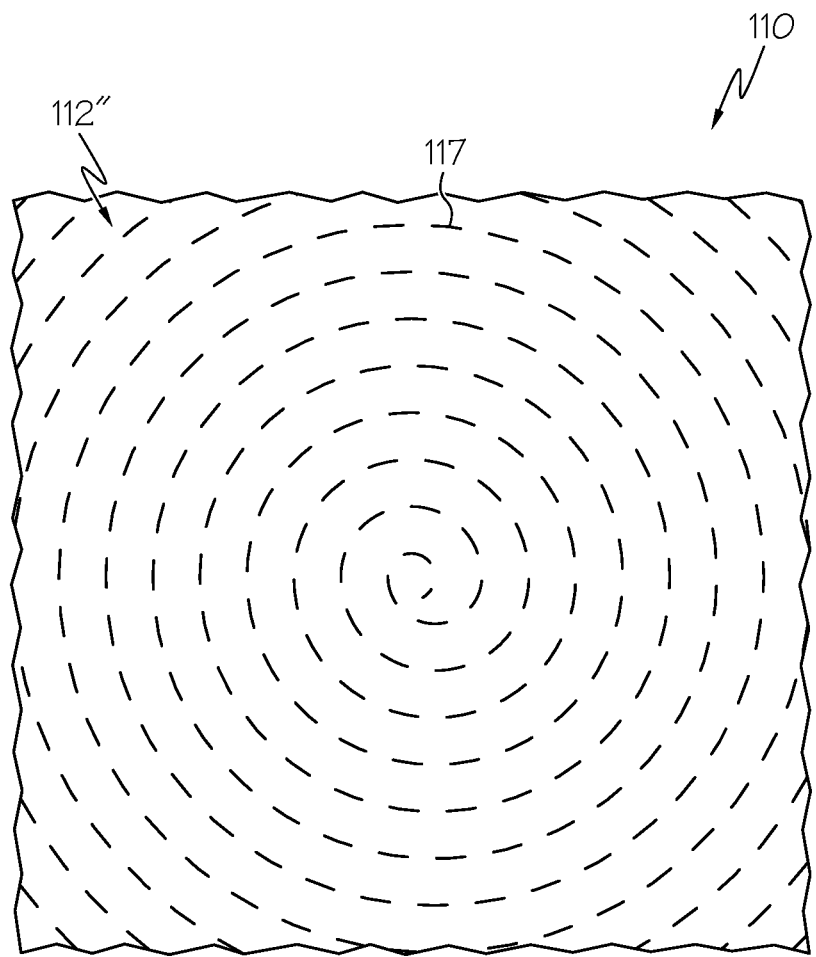
FIG. 5 schematically depicts a non-strengthened glass article subjected to a laser micromachining process impressing defect lines in yet another pattern according to one or more embodiments described and illustrated herein.

Other defect line patterns may also be generated, such as two-dimensional patterns (e.g., x- and y-directions across the surface 109 of the non-strengthened glass article 108) and three-dimensional patterns (e.g., x- and y-directions across the surface 109 as well as a varied depth into the bulk of the non-strengthened glass article) based in Cartesian, polar, or curvilinear coordinates. For example, arbitrary defect lines may be formed within the perimeter of the desired etched feature(s) 112 (i.e., random defect pattern). FIG. 5 depicts an etched feature 112" having a circular or swirl defect line 117 pattern. The scan pattern, defect size (e.g., width and length of the modified regions formed by laser ablation), depth of the modified regions or defects, amount of pulse overlap PO, number of repeated scans, and separation distance between scan lines, and other parameters may affect the aesthetic and tactile properties of the etched feature(s) 112. Varied defect patterns may also be provided, wherein the spacing between defect lines and/or direction of defect lines vary across the etched feature 112. Any defect line pattern may be provided.

Figure 6:
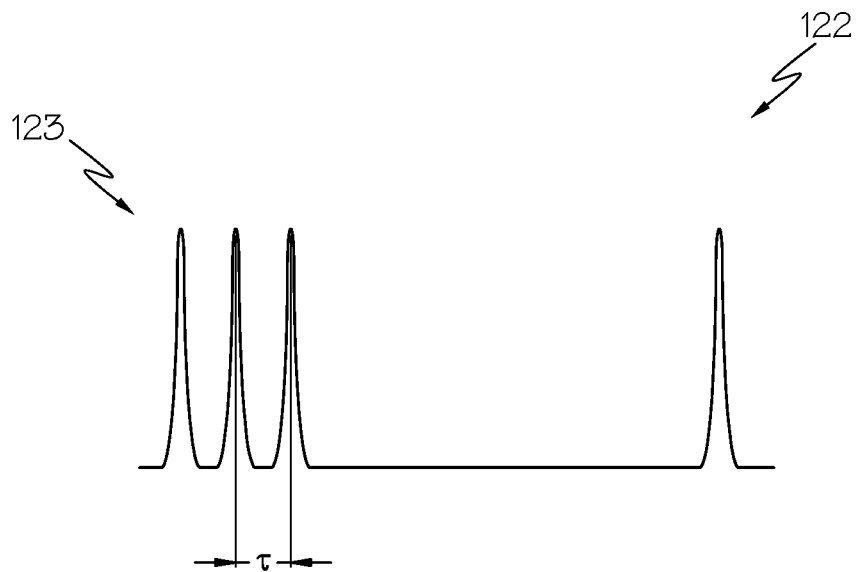
FIG. 6 schematically depicts a pulsed scanned laser beam according to one or more embodiments described and illustrated herein.

FIGS. 6-10 depict the relationship between scan speed S of the scanned laser beam, laser pulse repetition rate (i.e., frequency f) and the distance d between beam spots on the non-strengthened glass article. The distance d between beam spots may or may not provide for pulse overlap PO between successive beam spots. Referring initially to FIG. 6, a pulsed scanned laser beam 122 comprising a series of laser pulses 123 is illustrated. Each individual pulse of the series of laser pulses 123 has a pulse width pw, and the individual pulses occur at a frequency f such that the series of laser pulses as a period τ that is defined by 1/f. The pulse width pw may be as short as 10 femtoseconds in some embodiments. The pulse width pw may also be as short as possible using current and yet-to-be-developed lasers (e.g., as short as 1 attosecond).

Figure 7:
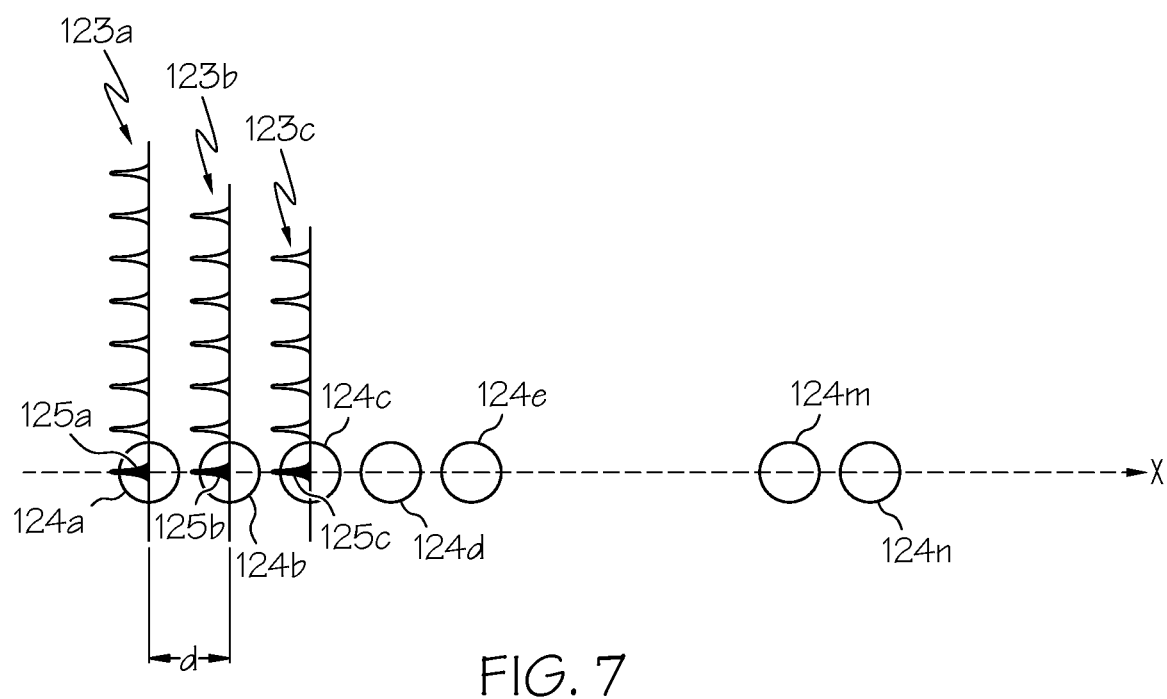
FIG. 7 schematically depicts a pulsed scanned laser beam generating beam spots on a surface of a non-strengthened glass article over time according to one or more embodiments described and illustrated herein.

FIG. 7 depicts a plurality of beam spots 124a-124n that are incident on the surface of non-strengthened glass article as the scanned laser beam 122 is scanned in the x-axis direction at a scan speed S. It should be understood that similar beam spots may be formed by scanning the scanned laser beam 122 in the y-axis direction. Laser pulse series 123a depicts the series of laser pulses 123 at one point in time such that individual pulse 125a is incident on the surface of the non-strengthened glass article and forms a beam spot 124a thereon. Laser pulse series 123b depicts the series of laser pulses 123 at a next point in time when the next successive individual laser pulse 125b is incident is incident on the surface of the non-strengthened glass article and forms the next beam spot 124b that is separated from the previous beam spot 124a by a distance d. Similarly, laser pulse series 123c is depicted as following laser pulse series 123b to form beam spot 124c via individual laser pulse 125c. Accordingly, the scan speed S and the frequency f of the series of laser pulses 123 affect the distance d between successive beam spots and, therefore, modified regions within the surface of the non-strengthened glass article. As described below with reference to FIGS. 9 and 10, the frequency f of the laser pulses 123 has a greater impact on distance between two beam spots (and therefore between defects or modified regions) than changes in scan speed S of the scanned laser beam 122.

Figure 8:
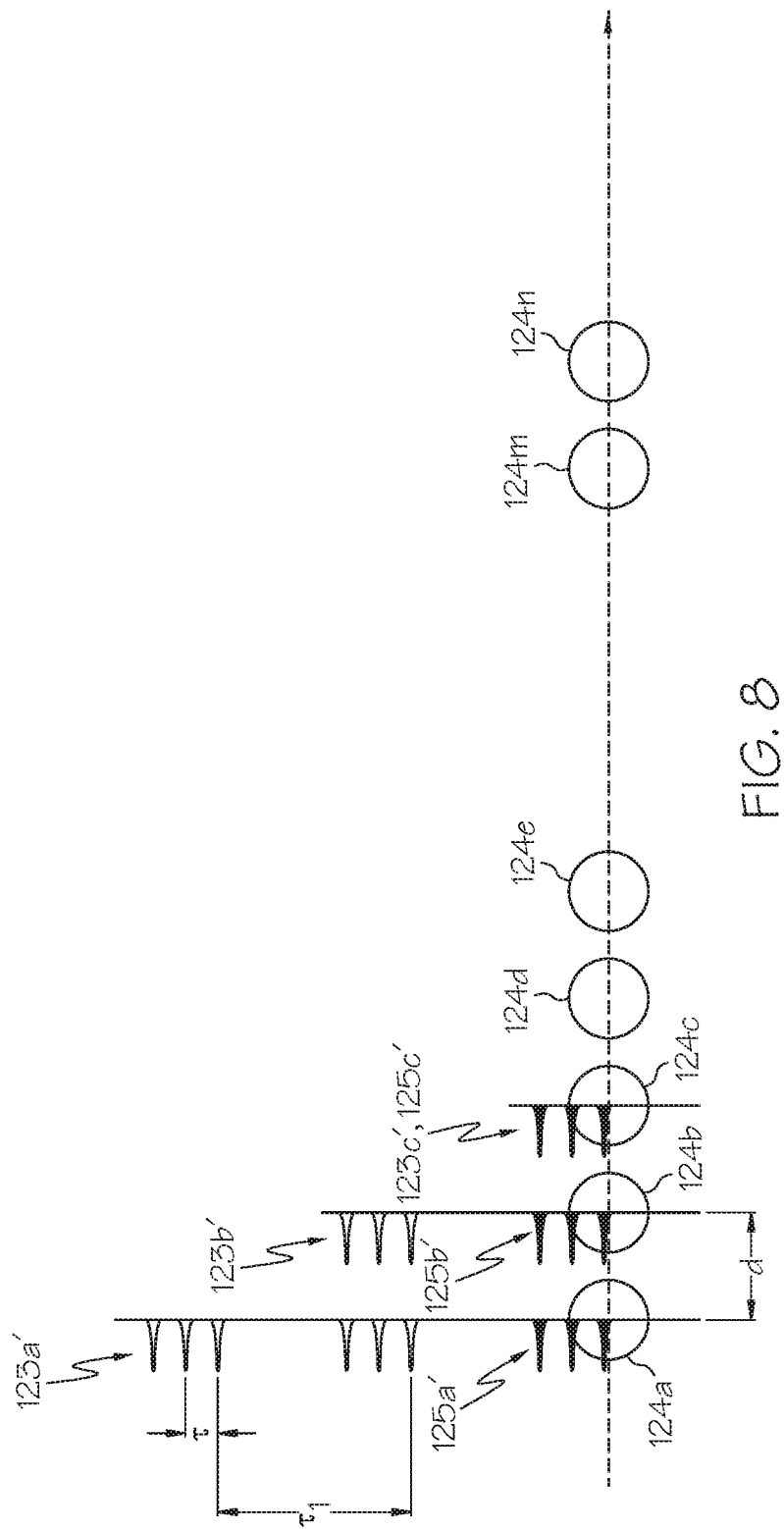
FIG. 8 schematically depicts a pulsed scanned laser beam comprising a plurality of laser pulse bursts generating beam spots on a surface of a non-strengthened glass article over time according to one or more embodiments described and illustrated herein.

Referring now to FIG. 8, in another embodiment, the beam spots are formed by a series of laser pulses $123a'$-$123c'$ that comprises a plurality of laser pulse bursts $125a'$-$125c'$ made up of two or more rapid laser pulses having a period τ. The laser pulse bursts have a period $τ_1$. For example, laser pulse burst $125a'$, which is made up of three laser pulses, creates beam spot $124a'$. Similarly, laser pulse burst $125b'$ creates beam spot $124b'$ and laser pulse burst $125c'$ creates beam spot $124c'$. Changes in the laser burst rate (i.e., frequency) has a greater impact on spacing between two beam spots than changes in the scan speed S of the scanned laser beam 122.

Figure 9:
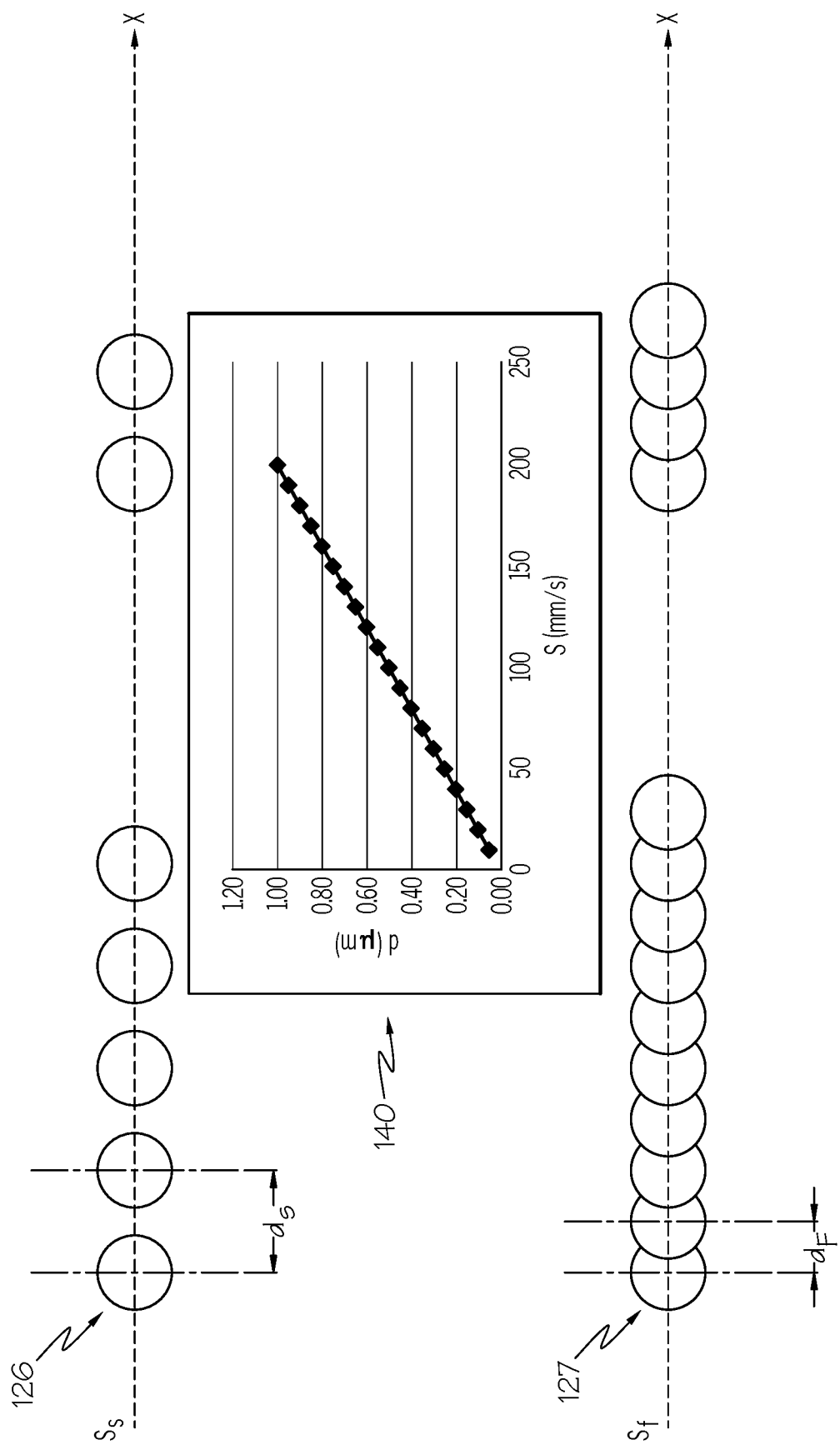
FIG. 9 schematically and graphically illustrates a relationship between laser scan speed and a distance between beam spots on a surface of a non-strengthened glass article according to one or more embodiments described and illustrated herein.
Figure 10:
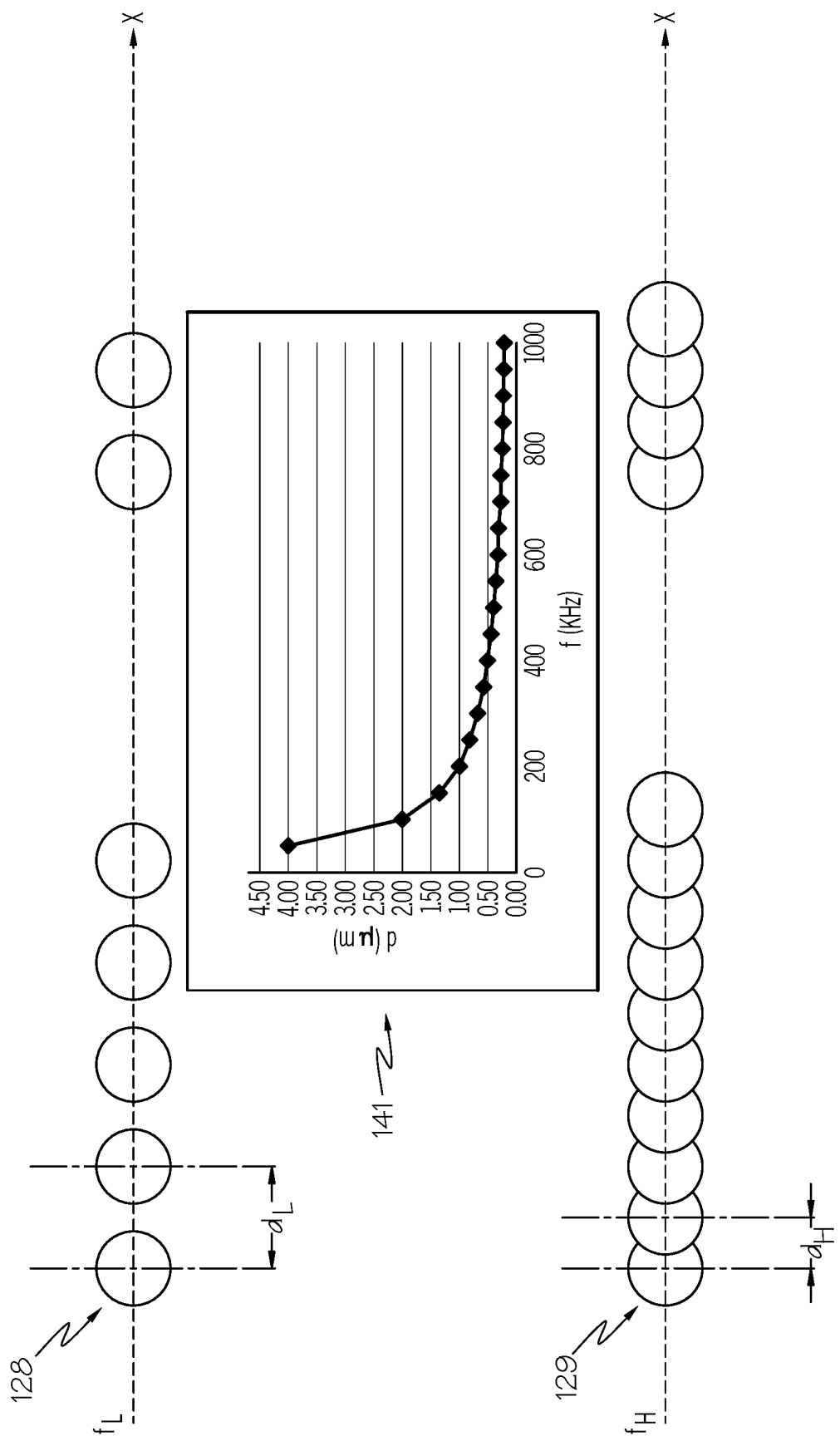
FIG. 10 schematically and graphically illustrates a relationship between laser pulse frequency and a distance between beam spots on a surface of a non-strengthened glass article according to one or more embodiments described and illustrated herein.

FIGS. 9 and 10 illustrate the relationship between scan speed S and the distance between beam spots, and the relationship between laser pulse frequency f and the distance between beam spots, respectively. The spacing of the modified regions created by the laser pulses may affect the texture of the etched feature 112 within the strengthened glass article 110 after a strengthening process (e.g., the surface roughness, the opacity, etc.). FIG. 9 illustrates a first series of laser pulses 126 at a constant frequency f (200 kHz) that are scanned across the non-strengthened glass article along the x-axis at a slow scan speed $S_s$, and a second series of laser pulses 127 occurring at the same constant frequency f as the first series of laser pulses 126 but scanned at a fast scan speed $S_f$. The slow scan speed $S_S$ produces a distance $d_S$ between successive beam spots, while the fast scan speed $S_f$ produces a distance $d_F$ between successive beam spots that is less than distance $d_S$ such that the beam spots overlap one another. Accordingly, increasing the scan speed of the scanned laser beam decreases the distance between modified regions created by the beam spots.

FIG. 9 also provides a chart 140 that plots the distance d (μm) between successive beam spots as a function of scan speed S (mm/s). There is a linear relationship between scan speed S and distance d between successive beam spots.

Referring now to FIG. 10, the relationship between the frequency f of the laser pulses and the distance d between successive beam spots is non-linear. FIG. 10 illustrates a first series of laser pulses 128 scanned across the surface of the non-strengthened glass article at a constant scan speed S (200 mm/s) and a low frequency $f_L$, and a second series of laser pulses 129 scanned across the surface of the non-strengthened glass article at the same constant scan speed S as the first series of laser pulses 128 but having a high frequency $f_H$. The high frequency $f_H$ produces a distance $d_H$ between successive beam spots that is less than the distance $d_L$ such that the beam spots overlap one another. Accordingly, increasing the frequency of the laser pulses decreases the distance between modified regions created by the beam spots. FIG. 10 also provides a chart 141 showing the non-linear relationship between the frequency f and the distance d between successive beam spots.

Figure 11:
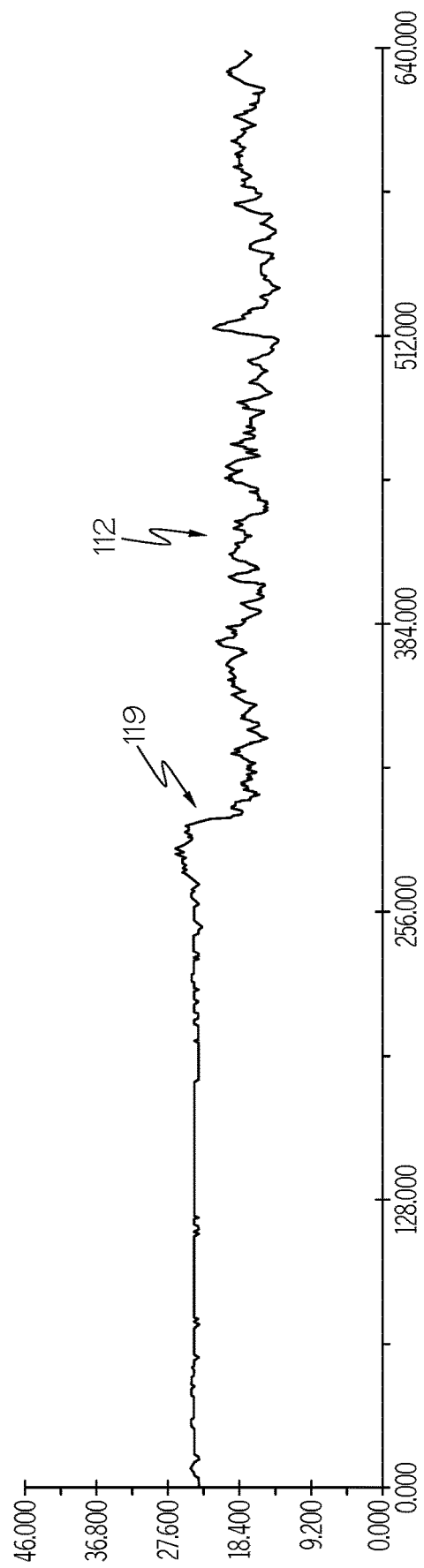
FIG. 11 schematically depicts a profile of a glass article having an etched feature according to one or more embodiments described and illustrated herein.

The various parameters described above, such as scan speed, laser pulse frequency, pulse width, average laser power, number of passes, hatch pattern, and the like may be manipulated to achieve a desired etched feature depth and surface roughness. The actual values of these parameters may depend on the material being machined. FIG. 11 depicts a profile of a laser machined surface of Corning Gorilla® Glass wherein the etched feature 112 has an etched depth of about 5 μm. The etched feature 112 has a perimeter wall 119 that is substantially vertical. The perimeter wall 119 separates the etched feature 112 from the surrounding surface of the glass substrate. The angle of the perimeter wall 119 may impact the tactile feel of the etched feature 112, as well as the resistance to damage of the etched feature 112 to impact as it may become a stress concentration point. FIG. 11 also depicts that the etched feature 112 has a particular surface roughness. The surface roughness may be varied by manipulating the parameters described above.

The non-strengthened glass article 108 may be subjected to a chemical strengthening process after the etched feature 112 formed by the laser machining processes described above. In one embodiment, the non-strengthened glass article 108 is chemically strengthened by an ion exchange process in which smaller metal ions in the glass are replaced or exchanged with larger metal ions of the same valence within a layer of the glass that is close to the outer surface of the glass. The replacement of smaller ions with larger ions creates a compressive stress within the surface of the glass article or sheet which extends to a depth of layer (DOL).

In one embodiment, the metal ions are monovalent alkali metal ions (e.g., $Na^+$, $K^+$, $Rb^+$, and the like), and ion exchange is accomplished by immersing the glass article 108 in a bath comprising at least one molten salt (e.g., $KNO_3$, $K_2SO_4$, KCl, or the like) of the larger metal ion that is to replace the smaller metal ion in the glass. Alternatively, other monovalent cations such as $Ag^+$, $Tl^+$, $Cu^+$, and the like can be exchanged for the alkali metal cations in the glass material. The ion exchange process or processes that are used to strengthen the glass articles can include, but are not limited to, immersion of the glass in a single bath or immersion of the glass in multiple baths of like or different compositions with washing and/or annealing steps between immersions.

Figure 12:
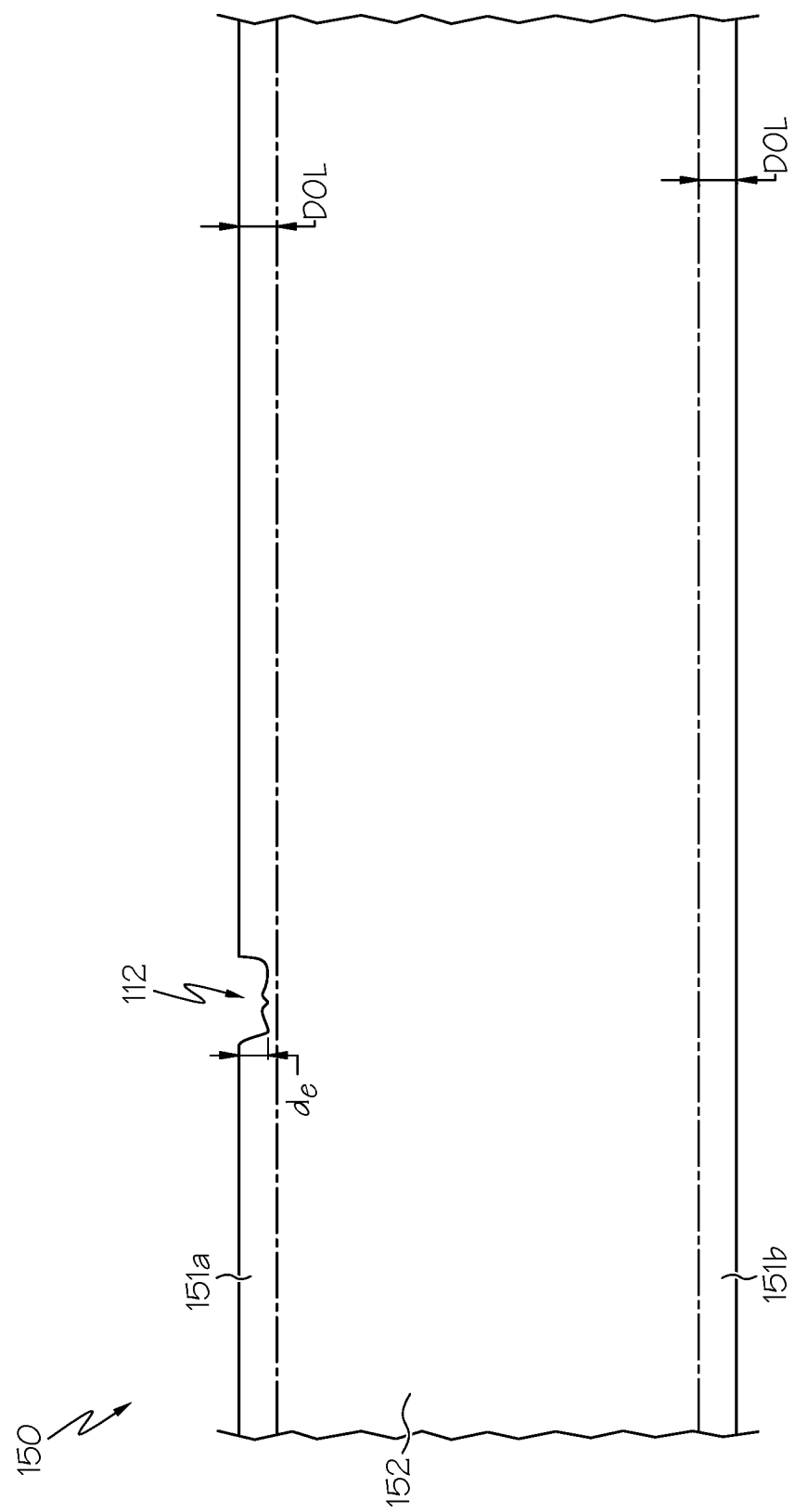
FIG. 12 schematically depicts a cross-sectional view of a strengthened glass article having an etched feature according to one or more embodiments described and illustrated herein.

FIG. 12 illustrates a cross-sectional view of a strengthened glass article 150 having an etched feature 112. The chemical strengthening process induces first and second strengthened layers $151a$, $151b$ under compressive stress and extending from first and second surfaces of the strengthened glass article 150, respectively. The first and second strengthened layers $151a$, $151b$ extend to the DOL. The compressive forces of the first and second strengthened layers $151a$, $151b$ are balanced by tensile forces of a central region 152 under tension. Depending on the composition of the glass material and the strengthening process, the DOL may be greater than 5 μm and the surface compression of the first and second strengthened layers $151a$, $151b$ may be greater than 100 MPa. Surface compressions greater than 750 MPa and DOLs greater than 40 μm are readily achieved in Gorilla® Glass manufactured by Corning Incorporated. In some embodiments, the etched feature may then be chemically etched to blunt the defects (e.g., a flare process) created during laser micromachining to even further the impact of the machined area on overall strength.

When the non-strengthened glass article 108 is submitted to chemical strengthening, the laser processed area defining the etched feature 112 and the surfaces not processed by the machine (i.e., the untouched surfaces) are strengthened simultaneously. To preserve compressive strength of the strengthened glass article 150, particularly in the region of the etched feature 112, it may be desirable to ensure that the etched feature depth $d_e$ of the etched feature 112 is less than the depth of layer of the strengthened glass article 150. However, embodiments are also contemplated wherein the etched feature depth $d_e$ is greater than the depth of layer, particularly in embodiments having a shallow depth of layer.

In the case of Gorilla® Glass, because of the deeper DOL of the first and second strengthened layers 151a, 151b, most of the defects or modified regions of the etched feature 112 will be frozen by the high compressive stress, thereby resulting in a strong glass article.

It may be desirable to manipulate the chemical strengthening process to prevent the glass article from breaking due to a weak spot in the etched feature caused by a difference in surface roughness and flaw population between the etched feature region and the non-etched surface of the glass article. The amount of stress induced into the etched feature region at the initial stages of the chemical strengthening process may be reduced to prevent the formation of median cracks. There are several ways to reduce the stress in the early stages of chemical strengthening, all of which may be performed individually or in combination with one another. The amount of larger ions (e.g., K) in the bath may allow the stress to be lower initially but also stay low throughout the chemical strengthening process and also enable the glass article to achieve its desired strengthened layers. Additionally, the thermal cycle during the chemical strengthened process may be adjusted by pre-heating the bath followed by a slow cool down of the glass article to alleviate thermal effects.

Chemical etching may also be utilized to round the defects of the etched feature so that when the etched features are in the high-stress environment of the chemical strengthening bath, the glass article will not form median cracks and break but rather redistribute the stresses enough to allow the glass article to stay intact during the initial minutes of chemical strengthening. Additionally, chemical etching may also be used to slightly roughen the non-etched feature surfaces of the glass article to lessen the surface roughness difference between the etched feature and the remaining surface of the glass article.

In some embodiments, the non-strengthened glass article may be strengthened first before laser micromachining of the etched feature. Accordingly, the etched feature may be micromachined by the laser directly into a strengthened surface layer.

Figure 13A:
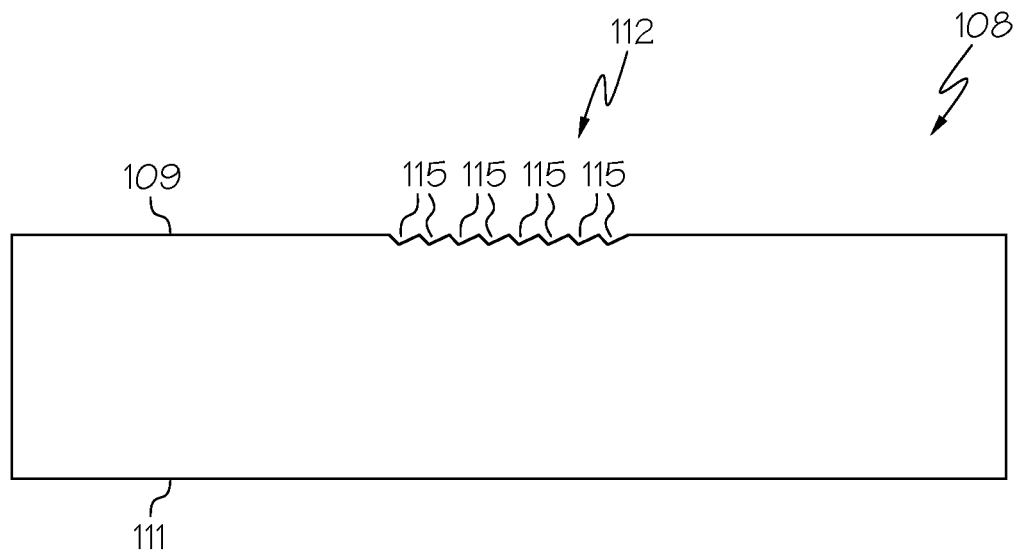
FIG. 13A schematically depicts a cross-sectional view of a strengthened glass article having an etched feature configured as a diffractive grating according to one or more embodiment described and illustrated herein.
Figure 13B:
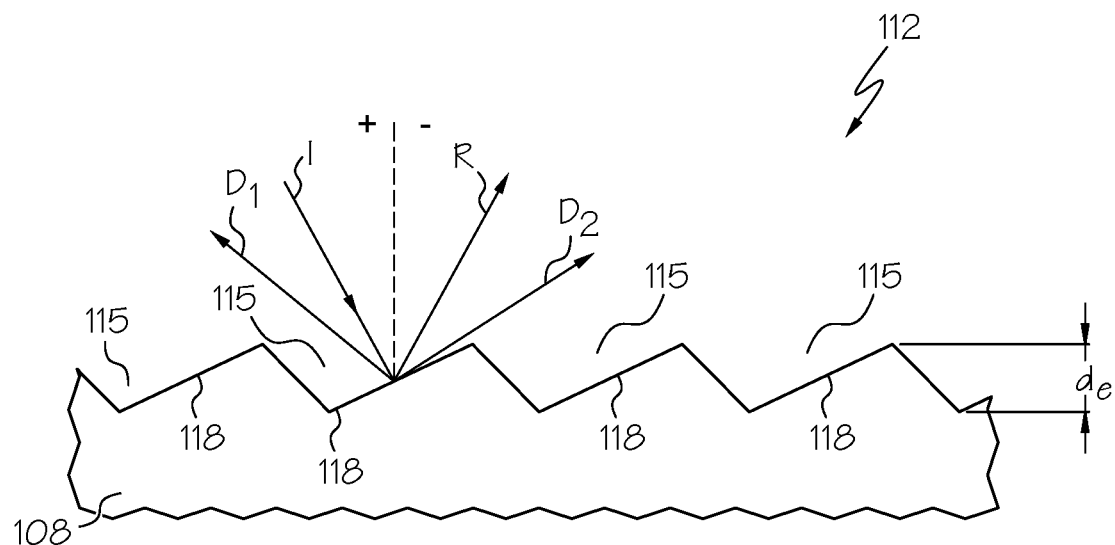
FIG. 13B schematically depicts a close-up view of the etched feature depicted in FIG. 13A.

In some embodiments, the etched feature depth $d_e$ and the separation distance (e.g., the horizontal separation distance $d_{sh}$, and/or the vertical separation distance $d_{sv}$) between defect lines (e.g., horizontal defect lines 115 and/or vertical defect lines 116) may be such that the defect lines of the etched feature 112 create a diffractive grating effect. Referring now to FIGS. 13A and 13B, an exemplary etched feature 112 is schematically depicted. FIG. 13B is a close-up view of the etched feature depicted in FIG. 13A. The illustrated etched feature 112 comprises a plurality horizontal defect lines 115 (see also FIG. 3) processed by a laser as described above. The horizontal defect lines 115 have a line spacing defined by the horizontal separation distance $d_{sh}$, between adjacent horizontal defect lines 115. The line spacing is such that the horizontal lines 115 define a diffractive grating having angled facets 118 splits and diffracts incident light I into several beams (e.g., diffracted beam $D_1$ or diffracted beam $D_2$) as well as reflects light R which may provide an additional visual indicator to a user of the presence and location of the etched feature 112. The line spacing may be such that the desired diffractive grating effect is achieved. The diffractive grating effect may be transmissive or reflective. As an example and not a limitation, the line spacing may be defined by a horizontal separation distance $d_{sh}$, (or vertical spacing distance $d_{sv}$, or other spacing distance between defect lines of other configuration) that is typically on the order of 1 to 3 μm. The horizontal defect lines are configured as triangular grooves when viewed in cross-section in the illustrated embodiment. However, it should be understood that embodiments are not limited to triangular grooves, and that other groove shapes are possible.

Various layers may also be applied to the surface of the glass article before or after laser ablation and/or chemical strengthening. For example, in some embodiments, layers such as hydrophobic and/or oleophobic coatings may be applied to the surface of the glass article to prevent the accumulation of water, oil (e.g., sebum) and other substances. Other thin film layers that provide decorative or other functionality to the glass article may also be applied. As an example and not a limitation, in cover glass for smart phones, the areas surrounding the display are normally hidden by applying layers of opaque material layers to the glass surface. The various thin film layers may include, but are not limited to metal, non-conductive metal or metal oxide, or other oxide material that is applied to the glass article, either to the etched feature or to the non-etched surface of the glass article.

Figure 14:
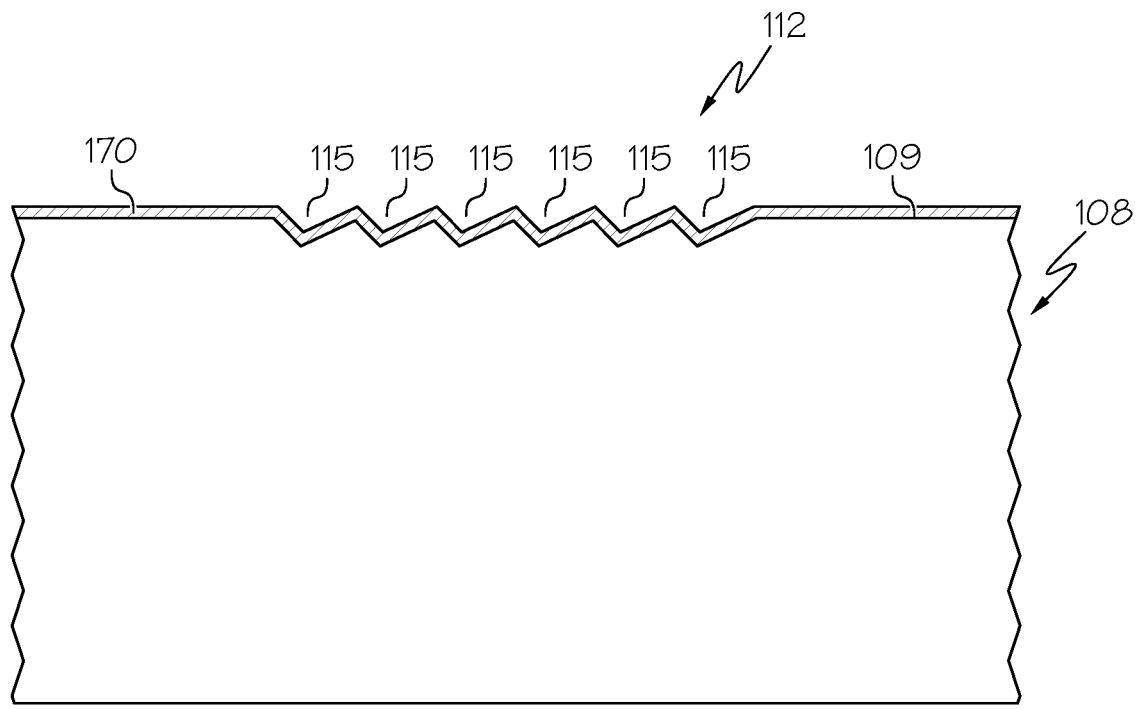
FIG. 14 schematically depicts a strengthened glass article depicted in FIG. 13A with one or more thin layers applied to a surface according to one or more embodiments described and illustrated herein.

One or more thin layers of material may also be applied to the glass article for aesthetic purposes. For example, one or more thin layers of material may be deposited on the etched feature, as well as surrounding areas of a surface of the glass article, to provide holographic, iridescent, and/or matte aesthetic to the surface of the glass article. Referring now to FIG. 14, one or more thin layers 170 may be applied to the surface 109 of the glass article 108 having the one or more etched features 112. FIG. 14 schematically depicts one or more thin layers 170 applied to the glass article 108 depicted in FIGS. 13A and 13B such that the one or more thin layers 170 are deposited on the horizontal lines 115 having a line spacing to create a diffractive grating effect. The one or more thin layers 170 may follow the shape of the etched feature 112. In some embodiments, the one or more thin layers 170 may be provided only locally at the etched feature, or cover additional areas of the surface 109 of the glass article. It should be understood that the one or more thin layers 170 may be applied to a surface of the glass article 108 having an etched feature with a pattern other than horizontal lines (e.g., swirl pattern, cross-hatch pattern, one-dimensional pattern, two-dimensional pattern, random pattern, a varied pattern, etc.).

They type of material chosen for the one or more thin layers 170 may depend on the desired aesthetic effect. For example, to achieve a holographic or iridescent effect, reflective materials such as metals (e.g., Al, Cu, Au) and/or dielectric materials (e.g., $MgF_2$, silica, $Ta_2O_5$, and ZnS) may be deposited on the etched feature 112 as well as the surrounding area. The thin layers of material may be applied by any known or yet-to-be-developed technique including, but not limited to, physical vapor deposition, chemical vapor deposition, ion beam deposition, molecular beam epitaxy and sputter deposition. In some embodiments, the material is chosen such that the diffractive grating of the etched feature only diffracts the wavelength of certain colors (e.g., red). The etched pattern of the etched feature may be chosen to create micro-features such that the etched feature provides an iridescent effect in conjunction with the material of the one or more thin layers 170.

As an example and not a limitation, the thickness of the one or more thin layers corresponds with the wavelength of light that is diffracted. For example, the thickness of the one or more thin layers may be on the order of hundreds of nanometers. Other thicknesses may be used depending on the material or the application.

As stated above, the one or more thin layers 170 may also be applied to the etched feature 112 (as well as the surrounding area of the glass article 108) to reduce the glossiness of the etched feature 112 and surrounding area of the glass article 108 (i.e., to provide a matte appearance). For example, one or more thin layers a polymer material may be applied to reduce the reflectivity of the etched feature 112 and/or surrounding areas of the glass article 108.

Figure 15:
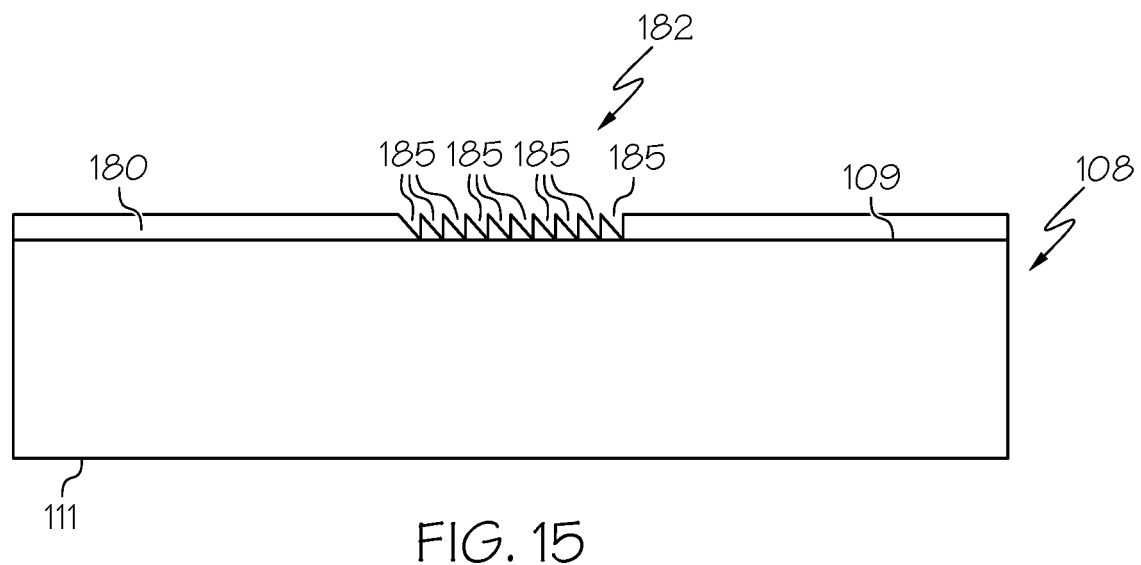
FIG. 15 schematically depicts a strengthened glass article including one or more thin layers applied to a surface of a strengthened glass substrate, wherein the one or more thin layers have an etched feature formed therein according to one or more embodiments described and illustrated herein.

Referring now to FIG. 15, one or more thin layers 180 may be applied to a first surface 109 of a glass article prior to laser processing. FIG. 15 schematically depicts an embodiment wherein the one or more thin layers 180 (e.g., metal, non-conductive metal, non-conductive metal oxide, or other oxide material layers) are first applied to the first surface 109 of the glass article 108. The scanned laser beam 122 is operated such that only the one or more thin layers 180 are ablated to form scanned lines 185 in a desired pattern (e.g., ordered, varied, or random one-dimensional or two-dimensional pattern) of an etched feature 182 as described above. In such embodiments, the glass article 108 is not ablated by the laser. The etched feature 182 within the one or more thin layers 180 may have a different appearance and texture than the surrounding areas of the one or more thin layers 180, as described above with respect to etched features 112 within a surface of the glass article 108. The one or more thin layers 180 and the etched feature(s) 182 may create a holographic, iridescent, and/or matte aesthetic.

Figure 16:
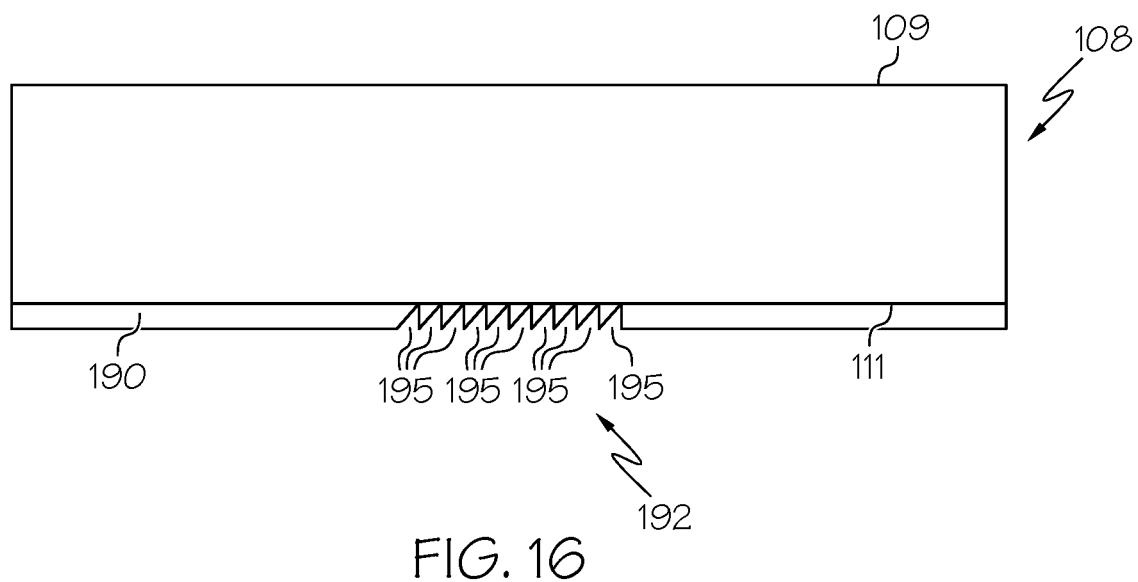
FIG. 16 schematically depicts a strengthened glass article including one or more thin layers applied to an underside surface of a strengthened glass substrate wherein the one or more thin layers have an etched feature formed therein according to one or more embodiments described and illustrated herein.

FIG. 16 schematically depicts an embodiment wherein one or more thin layers 190 are applied to a second surface 111 (i.e., underside surface) of the glass article 108. The laser beam 122 may be operated such that it does not damage or otherwise affect the glass article 108 but ablates the one or more thin layers 190 at the second surface 111 to form damage lines 195 defining an etched feature 192. The one or more thin layers 190 may be processed from the underside surface 111 of the glass article 108, or through the glass article 108 from the top surface 109.

Example

Embodiments described herein will be further clarified by the following example. Sample non-strengthened glass articles were laser machined using a commercial 10 picosecond pulsed laser (Rapid series by Lumera Laser) operated at a wavelength of 355 nm, a frequency (i.e., repetition rate) of 100 kHz, and an average power of 1.8 W. The pulsed laser beam was scanned on 0.7 mm thick Gorilla® Glass samples (e.g., code 2318 and code 2319) using an f-theta lens and a pair of galvo scanning mirrors (intelliSCAN® model laser scan head sold by SCANLAB AB). The focused laser beam had a beam spot size of about 12 µm in diameter and was scanned at certain speeds following a cross-hatch pattern (see FIG. 4), which as repeated one or more times depending on the desired depth to be etched. Using this laser etching system, a 10 µm etch depth etched feature was achieved with a single pass at 10 cm/s scan speed using a cross-hatch pattern. The measured etch depth increased to 10 µm when the scanning speed was 25 cm/s and the cross hatch pattern was repeated twice. It is predicted that the use of longer wavelengths (e.g., 532 nm, 1064) will result in features of similar characterizes, and may be preferred in production due to higher efficiency, higher throughput, and lower cost. The etched feature has a geometric configuration as illustrated in FIG. 1.

Samples were submitted to an ion exchanging chemical strengthening process ($KNO_3$ bath at 410° C. for 7 hours) to increase strength by forming the first and second strengthened surface layers. To characterize the impact of the etched feature on glass substrate strength, the samples were submitted to a ring-on-ring strength test both under compression and tensile stress conditions. When the test was performed with the pattern being stressed in a compression mode, the laser etched feature is placed up in contact with the inner (i.e., smaller diameter) ring and the opposite configuration for the tensile mode.

One set of ten control samples (no etched feature) and several sets of five samples were prepared with two different etched depths (5 µm and 25 µm) and measured under compression and tensile stress. As shown in Table 1, the measured average ring-on-ring strength of the control set (no etched feature) was 140 MPa and there was virtually no change in average strength when testing the etched feature on the compression surface. A significant reduction in average strength was observed when the etched feature was tested on tensile surface (18% reduction for 5 µm etched depth and 44% reduction for 25 µm etched depth). However, in most applications the stresses induced onto the etched feature will be in the form of compressive stress due to the application of force to the etched feature by a user.

TABLE 1

|   | Control | 5 µm etch depth in tension | 25 µm etch depth in tension | 5 µm etch depth in compression | 25 µm etch depth in compression |
|---|---|---|---|---|---|
| 1 | 123.312 | 116.633 | 84.642 | 153.181 | 136.654 |
| 2 | 123.266 | 121.977 | 81.306 | 141.402 | 115.113 |
| 3 | 135.893 | 114.596 | 75.791 | 149.015 | 152.257 |
| 4 | 150.855 | 108.526 | 75.425 | 113.829 | 121.539 |
| 5 | 159.146 | 115.525 | 75.826 | 141.724 | 154.776 |
| 6 | 181.11 | | | | |
| 7 | 131.93 | | | | |
| 8 | 124.136 | | | | |
| 9 | 133.636 | | | | |
| 10 | 135.386 | | | | |
| avg. | 139.9 | 115.5 | 78.6 | 139.8 | 136.1 |
| st. dev. | 18.6 | 4.8 | 4.2 | 15.4 | 17.8 |

It should now be understood that embodiments of the present disclosure provide for strengthened glass articles having surfaces that are modified to include laser micromachined shapes, logos, and other contours for decorative, tactile and other functional purposes, as well as method for producing the same. In particular, with Gorilla® Glass and other glass compositions, the etched features may be used on touch panels or other 2D/3D devices and application and have the differential advantage of much stronger scratch and damage resistance provided by chemical strengthening processes while also including such etched features. The etched features may provide for tactile differentiation, which may allow the location of a reference point on the surface of a device, for example. Such etched features may also indicate the location of a virtual button, such as an ON/OFF button or a "Home" button, for example. Etched features may be provided on strengthened glass articles for a wide variety of applications, including, but not limited to, touch sensitive devices (e.g., mobile phones, tablets, laptop or desktop computers, televisions, etc.) and others such as labels, logos, decorations, and other functions in automotive, architectural or appliances applications. The etched features maintain a similar compressive stress resistance as non-etched surfaces of the strengthened glass article.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method of fabricating a strengthened glass article having an etched feature, the method comprising:
providing a non-strengthened glass article comprising a first surface and a second surface;
focusing a laser beam onto the first surface of the non-strengthened glass article to ablate material from the first surface;
translating the laser beam relative to the non-strengthened glass article within a boundary defined by a desired etched feature, wherein translation of the laser beam ablates the material from the first surface at a depth to form the etched feature; and
chemically strengthening the non-strengthened glass article by a chemical strengthening process after forming the etched feature, wherein:
the strengthened glass article comprises a first strengthened surface layer and a second strengthened surface layer under a compressive stress and extending from the first surface and the second surface of the strengthened glass article, respectively, to a depth of layer, and a central region between the first strengthened surface layer and the second strengthened surface layer that is under tensile stress; and
the depth of the etched feature is less than the depth of layer such that the etched feature is within the compressive stress layer.

2. The method of claim 1, further comprising, prior to chemically strengthening the non-strengthened glass article, chemically etching the etched feature to reduce a surface roughness of a surface of the etched feature.

3. The method of claim 1, wherein the laser beam is a pulsed laser beam having a pulse width greater than 10 femtoseconds.

4. The method of claim 3, wherein the pulsed laser beam is pulsed at a frequency less than about 100 MHz.

5. The method of claim 3, wherein the pulsed laser beam is translated on the first surface of the non-strengthened glass article at a scan speed within a range of about 10 cm/s to about 120 cm/s.

6. The method of claim 1, wherein translating the laser beam comprises translating the laser beam within the boundary of the desired etched feature to form a plurality of first defect lines along a first direction.

7. The method of claim 6, wherein translating the laser beam further comprises translating the laser beam within the boundary of the desired etched feature to form a plurality of second defect lines along a second direction, wherein the plurality of first defect lines intersect the plurality of second defect lines.

8. The method of claim 1, wherein translating the laser beam creates a plurality of defect lines separated by a separation distance such that the plurality of defect lines create a diffractive grating within the boundary of the etched feature.

9. The method of claim 1, wherein translating the laser beam comprises translating the laser beam to form a two-dimensional pattern or three-dimensional pattern within the boundary of the desired etched feature.

10. The method of claim 1, further comprising applying one or more layers of material on the surface of the strengthened glass article such that the one or more layers of material are disposed on the etched feature.

* * * * *